(12) United States Patent
Kurokawa

(10) Patent No.: US 11,505,060 B2
(45) Date of Patent: Nov. 22, 2022

(54) TRACTOR REDUCTANT TANK CONFIGURATION

(71) Applicant: YANMAR POWER TECHNOLOGY CO., LTD., Osaka (JP)

(72) Inventor: Yoshiaki Kurokawa, Osaka (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 0 days.

(21) Appl. No.: 17/235,121

(22) Filed: Apr. 20, 2021

(65) Prior Publication Data

US 2021/0237561 A1 Aug. 5, 2021

Related U.S. Application Data

(63) Continuation of application No. 16/499,052, filed as application No. PCT/JP2018/006135 on Feb. 21, 2018, now Pat. No. 11,007,869.

(30) Foreign Application Priority Data

Mar. 30, 2017 (JP) ................................ 2017-069275

(51) Int. Cl.
*B60K 15/063* (2006.01)
*F01N 3/20* (2006.01)
*B60K 13/04* (2006.01)

(52) U.S. Cl.
CPC .......... *B60K 15/063* (2013.01); *F01N 3/2066* (2013.01); *B60K 13/04* (2013.01); *B60Y 2200/221* (2013.01); *F01N 2610/1406* (2013.01)

(58) Field of Classification Search
CPC .... B60K 15/063; B60K 15/067; B60K 15/07; B60K 15/073; B60K 13/04;
(Continued)

(56) References Cited

U.S. PATENT DOCUMENTS 8,695,827 B2 * 4/2014 Klauer ................... B60K 13/04
141/369
9,174,682 B2 * 11/2015 Schmitz ................. B62D 25/10
(Continued)

FOREIGN PATENT DOCUMENTS

JP 2008-273372 A 11/2008
JP 2011-063988 A 3/2011
(Continued)

OTHER PUBLICATIONS

International Search Report dated May 29, 2018 issued in corresponding PCT Application PCT/JP2018/006135.

*Primary Examiner* — John D Walters
(74) *Attorney, Agent, or Firm* — Norton Rose Fulbright US LLP

(57) ABSTRACT

A tractor including: a traveling body having an engine; a post-processing device configured to purify exhaust gas of the engine; and a reductant tank configured to store a reductant to be supplied to the post-processing device. A pair of left and right fuel tanks are arranged respectively on left and right sides of a longitudinally midway portion of the traveling body. A tank-accommodation recess for accommodating a reductant tank is formed at a lower-front portion of one of the left and right fuel tanks. While the reductant tank is accommodated in the tank-accommodation recess, an upper front portion of the fuel tank and the reductant tank are aligned up and down.

20 Claims, 21 Drawing Sheets

(58) Field of Classification Search
CPC ............. B60K 2200/221; F01N 3/2066; F01N 2610/1406; B60Y 2200/221
See application file for complete search history.

(56) References Cited

U.S. PATENT DOCUMENTS

| | | | |
|---|---|---|---|
| 9,556,772 B2* | 1/2017 | Mitobe | B60K 13/04 |
| 9,803,533 B2* | 10/2017 | Nagano | F01N 13/14 |
| 2010/0282758 A1 | 11/2010 | Gaden et al. | |
| 2016/0129783 A1* | 5/2016 | Tamura | B60K 15/067 |
| | | | 180/344 |
| 2016/0305305 A1 | 10/2016 | Nagano et al. | |
| 2017/0113543 A1* | 4/2017 | Pelarski | B60K 13/04 |

FOREIGN PATENT DOCUMENTS

| | | |
|---|---|---|
| JP | 2013-151185 A | 8/2013 |
| JP | 2016-074267 A | 5/2016 |
| JP | 2016-185128 A | 10/2016 |
| JP | 2016-203753 A | 12/2016 |

* cited by examiner

TRACTOR REDUCTANT TANK CONFIGURATION

CROSS REFERENCES TO RELATED APPLICATIONS

This application is a continuation of U.S. patent application Ser. No. 16/499,052 filed Sep. 27, 2019 which is a national stage application pursuant to 35 U.S.C. § 371 of International App. No. PCT/JP2018/006135 filed Feb. 21, 2018 which claims priority under 35 U.S.C. § 119 to JP Pat. App. No. 2017-069275 filed Mar. 30, 2017, the disclosures of which are hereby incorporated by reference in their entireties.

DESCRIPTION

Technical Field

The present invention relates to a tractor for agricultural work, and more specifically, a tractor including a post-processing device for removing particulate matters, nitrogen oxides, and the like contained in exhaust gas from an engine.

Background Art

Traditionally, a technology which purifies exhaust gas discharged from a diesel engine, by providing an exhaust path with a case having therein a diesel particulate filter (hereinafter, DPF case) and a case having therein a selectively reducing catalyst (hereinafter, SCR case), as a post-processing device (also referred to as exhaust gas purification device), and introducing the exhaust gas discharged from the diesel engine into both cases (see for example Patent Literatures 1 and 2; hereinafter, referred to as PTL 1 and PTL 2, respectively) is known.

To remove nitrogen oxides in the exhaust gas through a selective catalytic reduction (SCR), a reductant (e.g., urea water) needs to be supplied. In order to mount an SCR denitration device to a tractor, a space is needed for not only mounting the SCR case but also for mounting a reductant tank.

CITATION LIST

PTL 1: Japanese Patent Application Laid-Open No. 2016-203753.
PTL 2: Japanese Patent Application Laid-Open No. 2016-74267.

In a tractor of the prior art, a pair of left and right fuel tanks are arranged respectively on left and right sides of a longitudinally midway portion of the traveling body, and a reductant tank is arranged in front of the left fuel tank. In other words, the left fuel tank and the reductant tank are aligned in the front and rear directions. For this reason, for example, even if a large capacity of the left fuel tank is needed, there is a limitation due to the longitudinal length of the tractor, and depending on the shape and the sizes of an operation unit (cabin) and steps may have to be sacrificed.

SUMMARY OF INVENTION

In view of the current circumstances described above, it is a technical object of the present invention to provide an improved tractor.

An aspect of the present invention is a tractor including: a traveling body having an engine; a post-processing device configured to purify exhaust gas of the engine; and a reductant tank configured to store a reductant to be supplied to the post-processing device, wherein a pair of left and right fuel tanks are arranged respectively on left and right sides of a longitudinally midway portion of the traveling body; a tank-accommodation recess for accommodating the reductant tank is formed, at a lower-front portion of one of the left and right fuel tanks; and while the reductant tank is accommodated in the tank-accommodation recess, an upper front portion of the one of the left and right fuel tanks and the reductant tank are aligned up and down.

The tractor according to the above-aspect of the present invention may be such that: a fueling cylinder protrudes upward from an upper surface at an upper front portion of the one of the left and right fuel tanks; and a supply cylinder protrudes obliquely upward and outward from an outside surface of the reductant tank with respect to a left-right direction.

The tractor according to the above-aspect of the present invention may be such that a reductant supply device for supplying the reductant in the reductant tank is arranged between the traveling body and the reductant tank.

The above-aspect of the present invention may be such that: steps for getting on and off an operation unit on the traveling body are arranged such that one of them and the other of them are disposed on the left and right, respectively, and an auxiliary frame extended towards the one of the left and right fuel tanks having the tank-accommodation recess is provided to the traveling body; and the reductant tank is supported by the auxiliary frame and one of the steps on the side where the one of the left and right fuel tanks having the tank-accommodation recess is disposed.

The present invention includes an aspect as described in claim 5. Namely, the aspect of the present invention described in claim 5 is a tractor including: a traveling body having an engine; a pair of left and right front wheels and a pair of left and right rear wheels to support the traveling body; steps for getting on and off an operation unit on the traveling body; a post-processing device configured to purify exhaust gas of the engine; and a reductant tank configured to store a reductant to be supplied to the post-processing device, wherein the reductant tank is arranged between one of the steps and one of the front wheels, on one of the left and right sides of the traveling body; and the front surface of the reductant tank has a recess for avoiding interference with the front wheel.

With the above-aspect of the present invention, a tractor includes: a traveling body having an engine; a post-processing device configured to purify exhaust gas of the engine; and a reductant tank configured to store a reductant to be supplied to the post-processing device. A pair of left and right fuel tanks are arranged respectively on left and right sides of a longitudinally midway portion of the traveling body. A tank-accommodation recess for accommodating the reductant tank is formed, at a lower-front portion of one of the left and right fuel tanks. While the reductant tank is accommodated in the tank-accommodation recess, an upper front portion of the one of the left and right fuel tanks and the reductant tank are aligned up and down. This can achieve both: a space for arranging the reductant tank, and the capacity of one of the left and right fuel tanks or even the capacity of both of the fuel tanks, without lengthening the longitudinal length of the tractor or sacrificing the size of the operation unit and the step.

Further, in the above-aspect of the present invention, a tractor including: a traveling body having an engine; a pair of left and right front wheels and a pair of left and right rear wheels to support the traveling body; steps for getting on and off an operation unit on the traveling body; a post-processing device configured to purify exhaust gas of the engine; and a reductant tank configured to store a reductant to be supplied to the post-processing device, wherein The reductant tank is arranged between one of the steps and one of the front wheels, on one of the left and right sides of the traveling body. A front surface of the reductant tank has a recess for avoiding interference with the front wheel. With the recessed of the front surface of the reducing agent, the front wheel does not interfere with the reductant tank when the front wheels are steered right or left. The reductant tank can be arranged as close as possible to the front wheel, and the longitudinal length of tractor and the like can be made compact.

DESCRIPTION OF EMBODIMENTS

Figure 1:
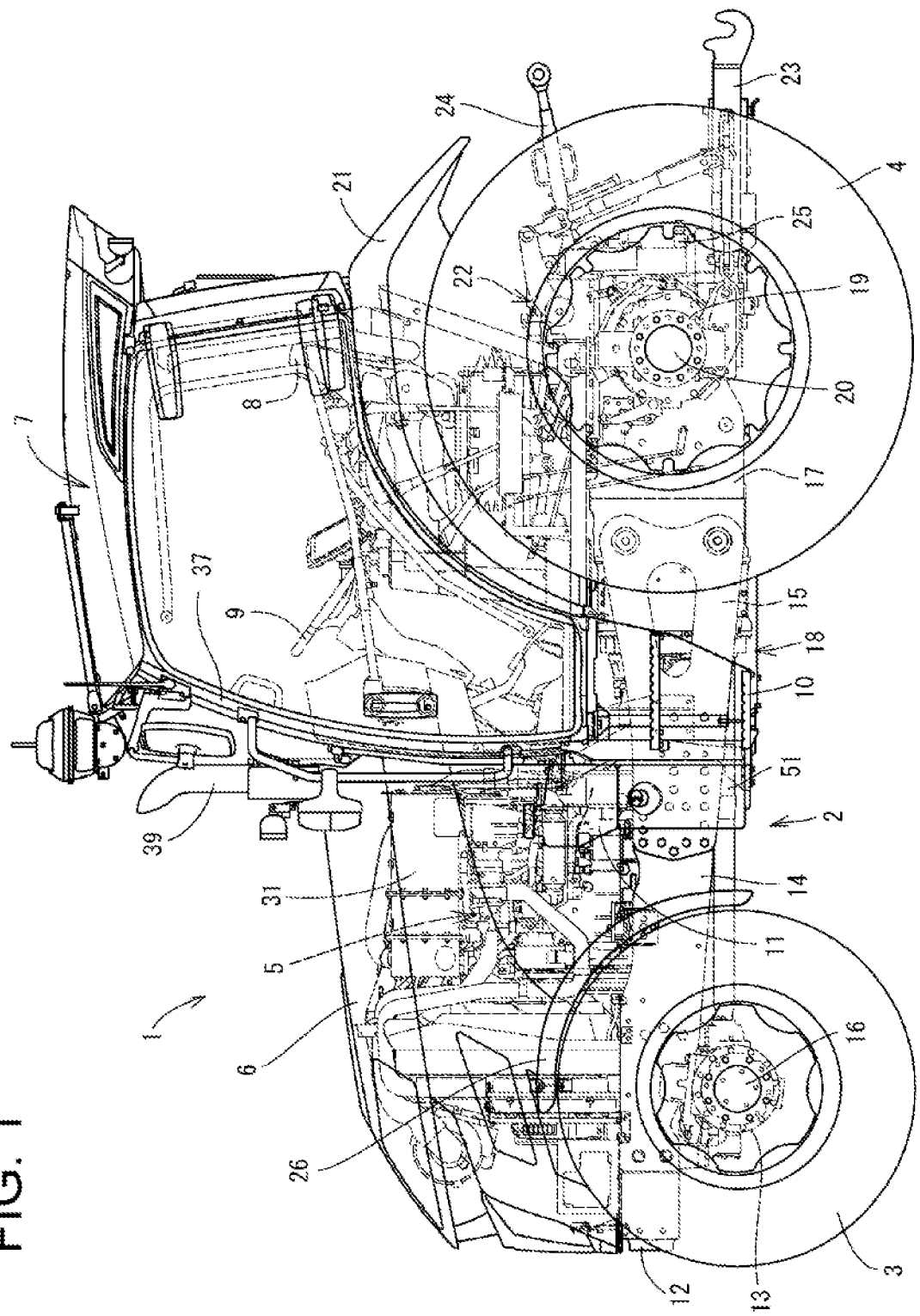
FIG. 1 illustrates a left side view of a tractor.
Figure 2:
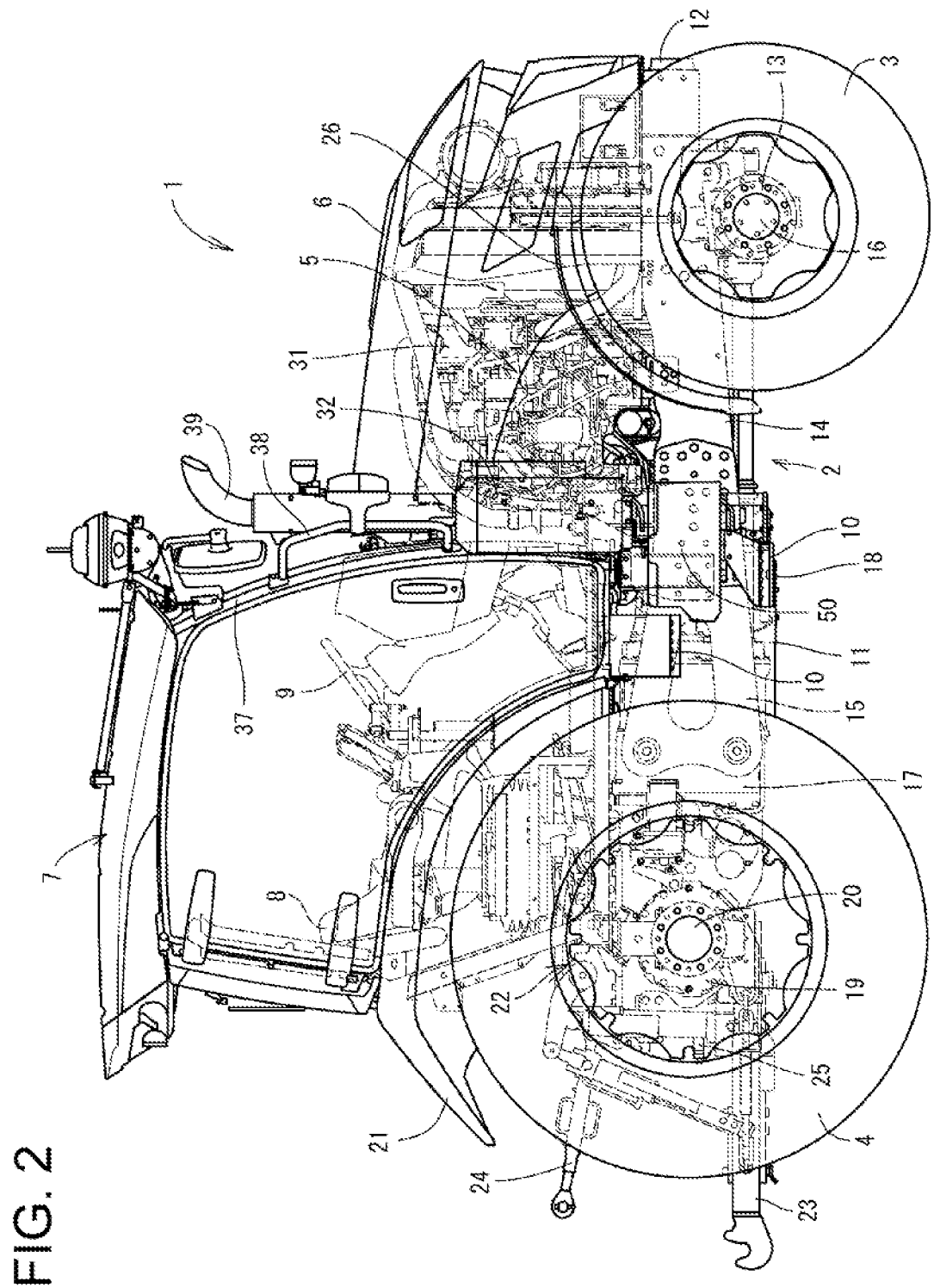
FIG. 2 illustrates a right side view of the tractor.
Figure 3:
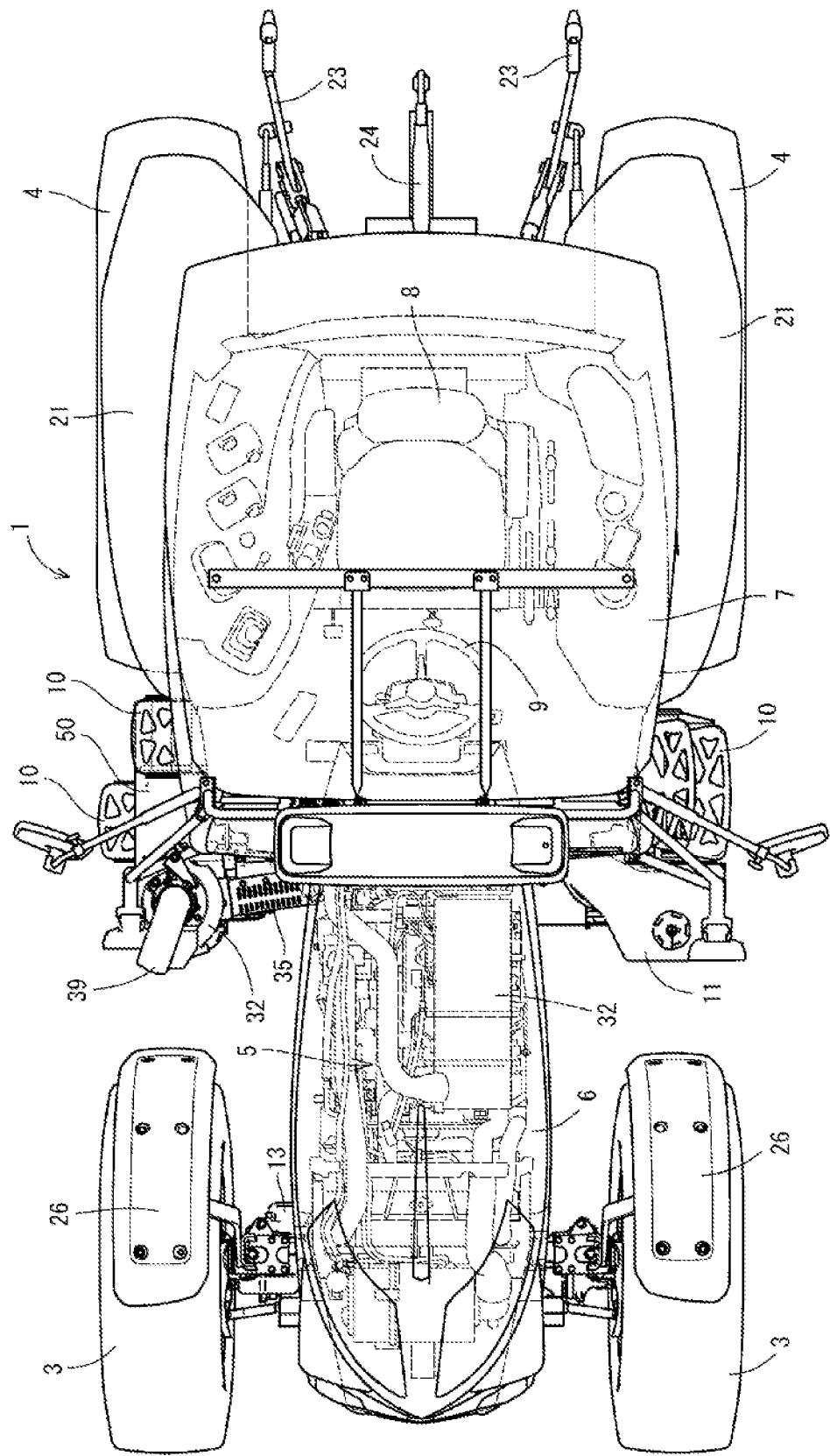
FIG. 3 illustrates a plan view of the tractor.

In the following, an embodiment of the present invention will be described with reference to the drawings. First, a structure of a tractor 1 of the present embodiment is described, with reference to FIG. 1 to FIG. 6. A traveling body 2 of the tractor 1 of the present embodiment is supported by a pair of left and right front wheels 3 and a pair of left and right rear wheels 4, as a traveling unit. The tractor 1 is structured to travel forward and backward by driving the rear wheels 4 and the front wheels 3 by means of a common rail type diesel engine 5 (hereinafter, simply referred to as engine) which is mounted in a front portion of the traveling body 2 and serves as a power source. The engine 5 is covered by a hood 6. A cabin 7 (also referred to as operation unit) is installed on an upper surface of the traveling body 2. In an inner portion of the cabin 7, there are arranged an operation seat 8 and a steering handle 9 configured to move a steering direction of the front wheels 3 right and left by steering. Steps 10 with which an operator gets on and off the vehicle are provided such that one of them and the other of them are disposed respectively in left and right lower portions of the cabin 7. A fuel tanks 11 for supplying fuel to the engine 5 is arranged below a bottom portion of the cabin 7.

The traveling body 2 includes: an engine frame 14 including a front bumper 12 and a front axle case 13; and left and right vehicle body frames 15 detachably fixed to a rear portion of the engine frame 14. A front axle 16 rotatably protrudes outward from both left and right ends of the front axle case 13. The front wheels 3 are attached to both left and right ends of the front axle casing 13 via the front axle 16. A transmission case 17 is coupled to the rear portions of the vehicle body frames 15. The transmission case 17 suitably shifts the rotary power from the engine 5, and transmits the force to the four front and rear wheels 3, 3, 4, and 4. The left and the right front wheels 3 have upper sides covered with left and right front fenders 26. The left and right front fenders 26 are supported above left and right end portions of the upper surface of the front axle case 13.

A tank frame 18 having a rectangular plate shape in bottom view and protruding outward toward the left and the right is fastened with bolts to an under surface side of the transmission case 17 and the left and the right vehicle body frames 15. In this embodiment, the fuel tanks 11 include two left and right tanks. The left and the right fuel tanks 11 are respectively mounted on the upper surface sides of the left and the right protruding portions of the tank frame 18. That is, a pair of left and right fuel tanks 11 are arranged respectively on the left and right sides of a longitudinally (i.e., with respect to the front-rear direction) midway portion of the traveling body 2. The tank frame 18 extends rightward, and a battery 50 is arranged in an extending portion on the right side of the tank frame 18. Further, to the extending portion on the right side of the tank frame 18 one of the steps 10 is fixed. Left and right rear axle cases 19 are attached to left and right outer side surfaces of the transmission case 17 so as to protrude outwardly toward left and right, respectively. Left and right rear axles 20 are rotatably inserted in the left and the right rear axle cases 19. The rear wheels 4 are attached to the transmission case 17 via the rear axles 20. The left and the right rear wheels 4 have upper sides covered with left and right rear fenders 21.

A hydraulic elevation mechanism 22 that can lift and lower a work machine (not illustrated), such as a rotary tiller for example, is detachably attached to an upper surface of the rear portion of the transmission case 17. The work machine is coupled to the rear portion of the transmission case 17 via a three-point link mechanism including a pair of left and right lower links 23 and a top link 24. A power-take off (PTO) shaft 25 protrudes rearward from a rear side surface of the transmission case 17 and is used for transmitting a PTO drive force to the work machine.

As shown in FIG. 5 to FIG. 8, in an exhaust path of the engine 5, a first case 31 (also referred to as DPF case) and a second case 32 (also referred to as SCR case) are provided as a post-processing device. The post-processing device removes particulate matter (e.g., soot and the like) and nitrogen oxides (NOx) contained in the exhaust gas of the engine 5, and discharges purified exhaust gas to the outside. In the present embodiment, the first case 31 accommodates therein an oxidation catalyst and a soot filter (not shown). In the second case 32, an SCR catalyst for urea selective catalytic reduction and an oxidation catalyst (not shown) are accommodated. The first case 31 is mounted at an upper portion of the engine 5, along a crank axis direction (in the front-rear direction, in the present invention). The second case 32 is arranged on the lower right portion of the front portion of the cabin 7, in a standing posture such that the exhaust gas flows from the bottom to the top.

An exhaust gas outlet side of the first case 31 is connected to an exhaust gas inlet side of a purification outlet pipe 33 which is long in a front-rear direction. In a midway portion of the purification outlet pipe 33 relative to its length direction, a bellows portion 34 for vibration absorption is provided. An exhaust gas outlet side of the purification outlet pipe 33 is coupled to an exhaust gas inlet side (upper end side) of a urea mixing pipe 35. The urea mixing pipe 35 has a substantially L-shape, which extends upward from a lower side on a right front side of the cabin 7, and at a lower side of the cabin 7 bent toward a direction away from the engine 5. An exhaust gas outlet side (lower end side) of the urea mixing pipe 35 is coupled to a lower side of a left side portion of the second case 32. The exhaust gas outlet side of the purification outlet pipe 33 and the exhaust gas inlet side of the urea mixing pipe 35 are coupled to the engine 5 through a flange. The engine 5 supports the exhaust gas outlet side of the purification outlet pipe 33 and the exhaust gas inlet side of the urea mixing pipe 35. An under surface side of the second case 32 is coupled to a later-described right front-portion support pedestal 96 through a case support bar 48. The exhaust gas having passed through the first case 31 is introduced into the second case 32 through the purification outlet pipe 33 and the urea mixing pipe 35.

To an upper end side of the urea mixing pipe 35, a urea water injection unit 36 is attached. Urea water (reductant) in a later-described urea water tank 51 (reductant tank) is supplied from the urea water injection unit 36 into the urea mixing pipe 35, and the urea water is hydrolyzed and mixed as ammonia, into the exhaust gas from the first case 31 to the second case 32. It should be noted that other reductant, e.g., ammonia or ammonia water may be used instead of urea water.

On the right side of the front portion of a box-frame-like cabin frame 37 constituting the cabin 7, an assist bar 38 is provided. The assist bar 38 is coupled to a plurality of positions of a tail pipe 39 which is long in an up-down direction, and which emits the exhaust gas to the outside. The tail pipe 39 is supported by the assist bar 38. An exhaust gas outlet side (upper surface side) of the second case 32 is connected to and in communication with an exhaust gas inlet side of the tail pipe 39. The exhaust gas of the engine 5 is purified by the first case 31 and the second case 32 and is emitted to the outside the machine through the tail pipe 39.

In the above structure, particulate matters (PM), carbon monoxide (CO), and hydrocarbon (HC) in the exhaust gas of the engine 5 are first reduced by the oxidation catalyst and the soot filter in the first case 31. In the inside of the urea mixing pipe 35, the urea water from the urea injection unit 36 is mixed with the exhaust gas having passed through the first case 31, and the nitrogen oxide (NOx) in the exhaust gas in which the urea water is mixed as ammonia is reduced by the SCR catalyst and oxidation catalyst in the second case 32. Then, the exhaust gas having passed through the second casing 32 is discharged to the outside of the machine from the tail pipe 39.

Figure 4:
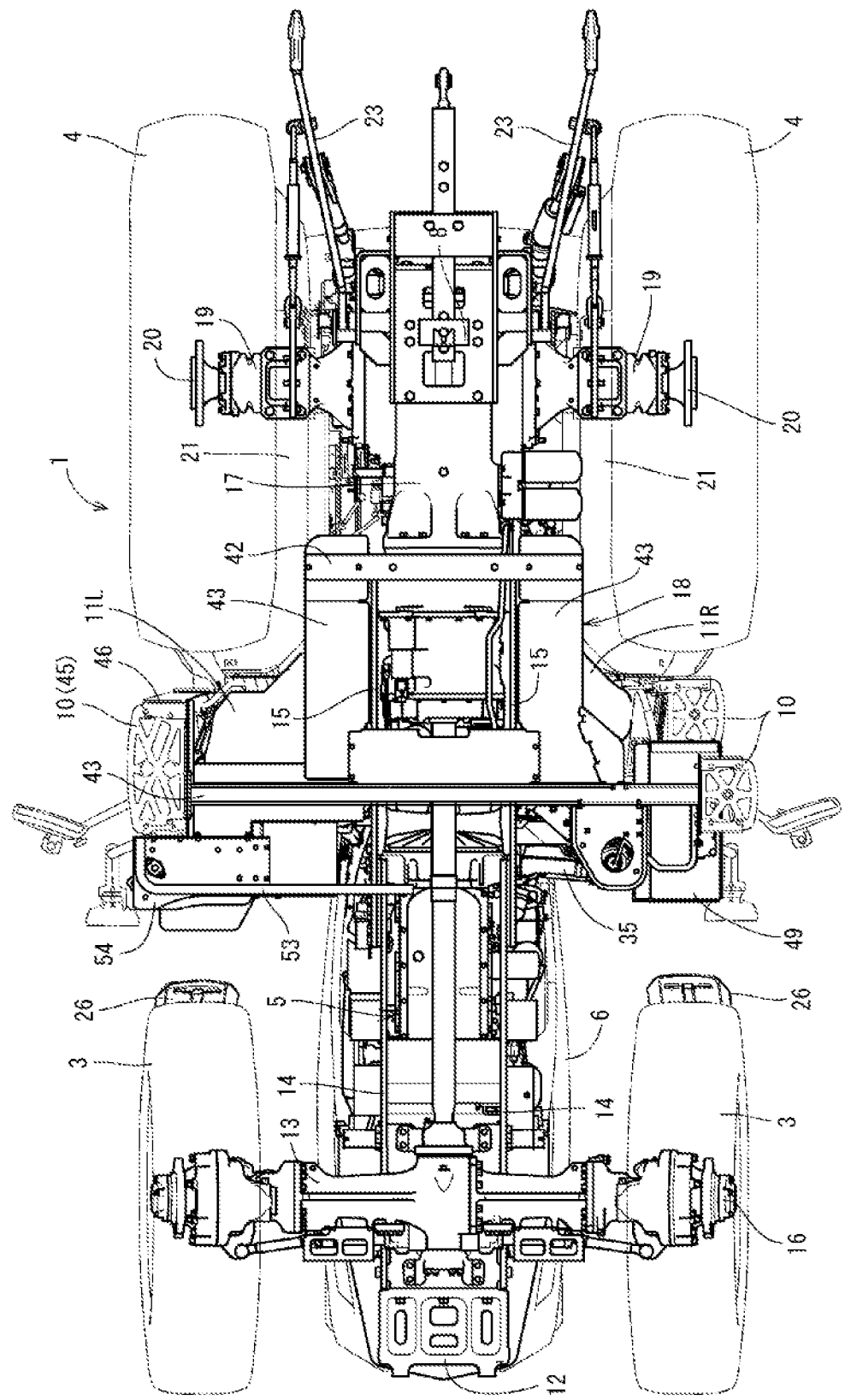
FIG. 4 illustrates a bottom view of the tractor.
Figure 5:
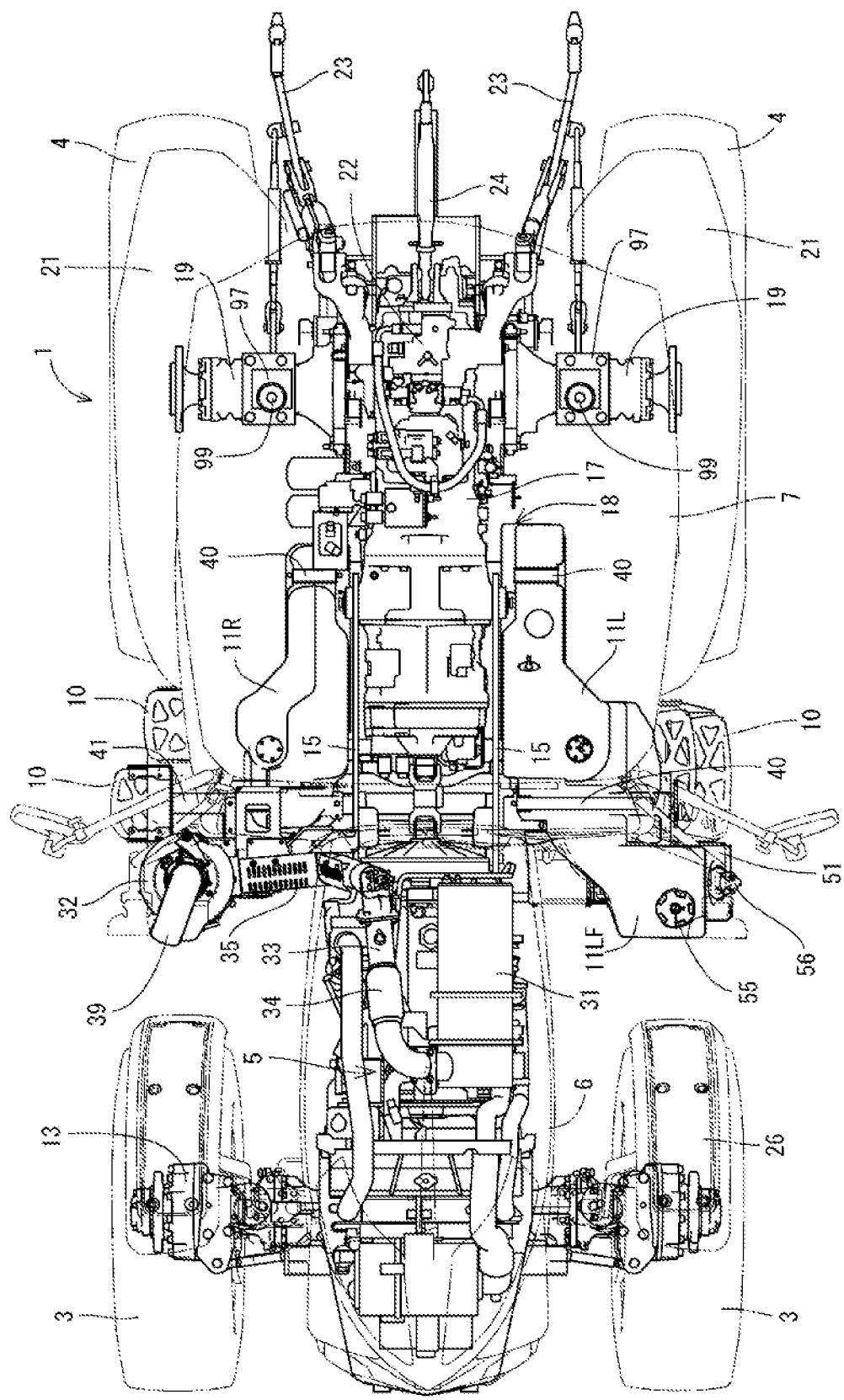
FIG. 5 illustrates a plan view of a traveling body of the tractor.
Figure 6:
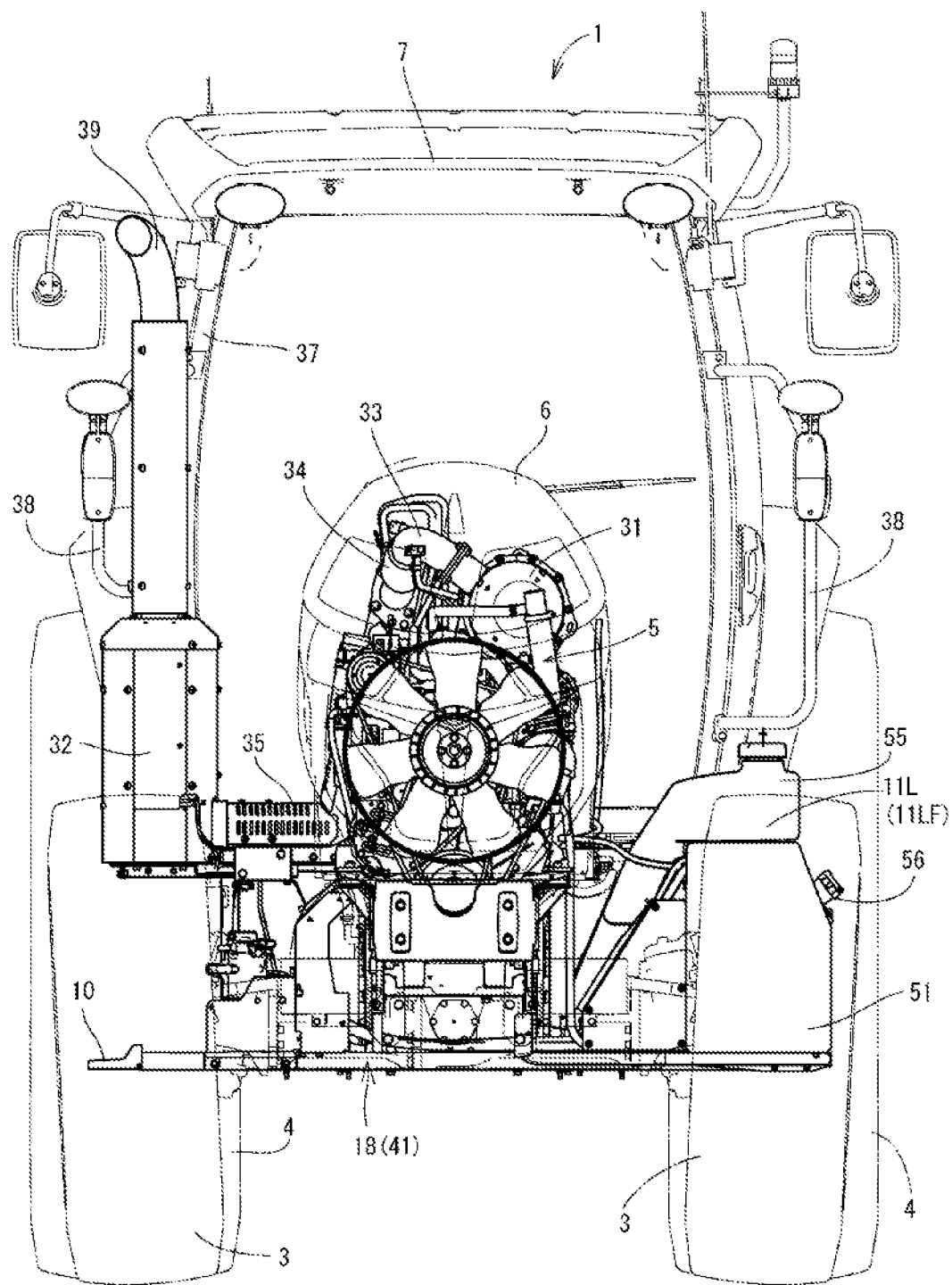
FIG. 6 illustrates a front view showing an internal structure of the tractor.

As shown in FIG. 4 and FIG. 5, a fuel tank 11 includes a left tank 11L and a right tank 11R arranged below the cabin 7, and inward from a pair of left and right steps 10 and the rear wheels 4 (on the side of the vehicle body frames 15). The left tank 11L and the right tank 11R are arranged respectively on the left and right so as to sandwich the pair of vehicle body frames 15. That is, a front portion of the left tank 11L is arranged between the left vehicle body frame 15 and the left step 10, while a rear portion of the left tank 11L is arranged between the left vehicle body frame 15 and the left rear wheel 4. Similarly, a front portion of the right tank 11R is arranged between the right vehicle body frame 15 and the right step 10, while a rear portion of the right tank 11L is arranged between the right vehicle body frame 15 and the right rear wheel 4. The respective capacities of the left tank 11L and the right tank 11R are different from each other. The left and right tanks 11L, 11R communicate with each other through a fuel communication tube (not shown) at lower portions of their surfaces facing inward. The left tank 11L with a large capacity protrudes forward from the left step 10 at the front of the cabin 7. In other words, the left tank 11L is formed so as to surround the right side and the front side of the left step 10.

The fuel tank 11 is placed on the tank frame 18 outwardly protruding toward left and right below the vehicle body frames 15, and fixed by a band 40. The tank frame 18 is formed in a rectangular plate shape in a bottom view, with: a front lateral bridge frame 41 suspended and fixed to the left and right vehicle body frames 15; a rear lateral bridge frame 42 fixed to an under surface of the transmission case 17; and left and right tank mounting plates 43 fixed on both ends of the lateral bridge frames 41, 42. The shapes of the left and right tank mounting plates 43 are substantially the same as the shapes of the bottom surface of the left tank 11L and the right tank 11R, respectively, and the left tank 11L and the right tank 11R placed on the upper surfaces of the tank mounting plates 43 are fixed by bands 40 at two positions that are the front and the rear.

As described, the tank frame 18 is constituted by the pair of front and rear lateral bridge frames 41, 42 extending left and right below the left and right vehicle body frames 15, and the pair of left and right tank mounting plates 43 bridged in the front-rear direction, on both left and right sides of the front and rear lateral bridge frames 41, 42. On the left and right tank mounting plates 43, the right and left fuel tanks 11L, 11R are placed and fixed, respectively.

Figure 8:
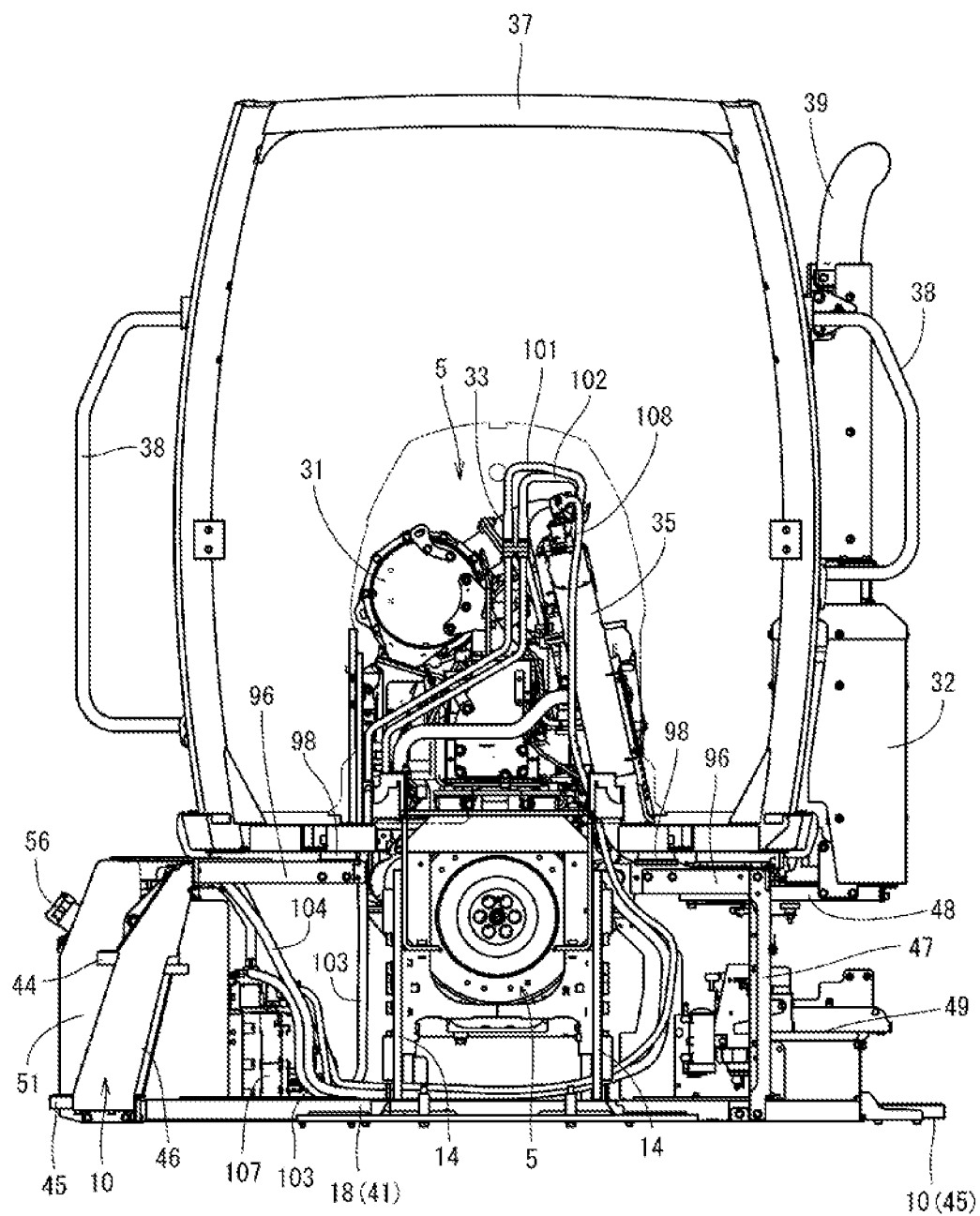
FIG. 8 illustrates a rear view showing a support structure of a cabin.

As shown in FIG. 1 to FIG. 5, the steps 10 for the operator to get on and off the vehicle are provided at lower portions on the left and right sides of the cabin 7. As shown in FIG. 8, the left step 10 is arranged to stand on the left end side of the front lateral bridge frame 41. To the upper end side of the left step 10, a left front-portion support pedestal 96 is attached. The left step 10 of the present embodiment includes two steps of foot plate members 44, 45, which are an upper and a lower foot plate members; and front and rear side plate members 46 coupled to these foot plate members 44, 45. The lower foot plate member 45 is fastened to the left end side of the front lateral bridge frame 41. To the upper end sides of the front and rear side plate members 46, the left front-portion support pedestal 96 is fastened. A portion of the left tank 11L close to its front portion is fitted in a space surrounded by the left front-portion support pedestal 96, the left step 10, and the front lateral bridge frame 41. To the right end side of the front lateral bridge frame 41, a lower foot plate member 45 constituting the right step 10 is fastened. The right step 10 includes the lower foot plate member 45 and an upper step plate member 44 coupled to a lower right portion of the cabin frame 37.

To a portion close to the right of the front lateral bridge frame 41, a standing support column 47 is provided. To the upper end side of the standing support column 47, the right front-portion support pedestal 96 is attached. In a space surrounded by the right front-portion support pedestal 96, the standing support column 47, and the front lateral bridge frame 41, a front portion of the right tank 11R is fitted. On the upper surface sides of the left and right front-portion support pedestals 96, a front bottom portion of the cabin 7 is supported, in a vibration controlled manner, through a vibration rubber member 98. On the front surface side of the right front-portion support pedestal 96, a case support bar 48 long in the left-right direction is fastened. To the upper surface on the right outer side of the case support bar 48, the under-surface side of the second case 32 is fastened. The second case 32 is supported by the right front-portion support pedestal 96 through the case support bar 48. Each of the left and right rear axle cases 19 extended horizontally in the left-right direction has, on its upper surface, a rear portion support pedestal 97 fastened to a middle portion of the upper surface relative to the left-right width. On the upper surface side of each of the left and right rear portion support pedestals 97, a rear bottom portion of the cabin 7 is supported, in a vibration controlled manner, through an anti-vibration rubber member 99. Therefore, the traveling body 2 supports the cabin 7 in a vibration controlled manner, through the anti-vibration rubber members 98, 99.

A battery seat 49 is attached to a midway portion of the standing support column 47 relative to the up-down direction. The battery 50 is mounted on the battery seat 49. In the embodiment, the battery 50 is located below the second case 32, and the lower foot plate member 45 of the right step 10 is located on the right outside of the battery 50.

Figure 9:
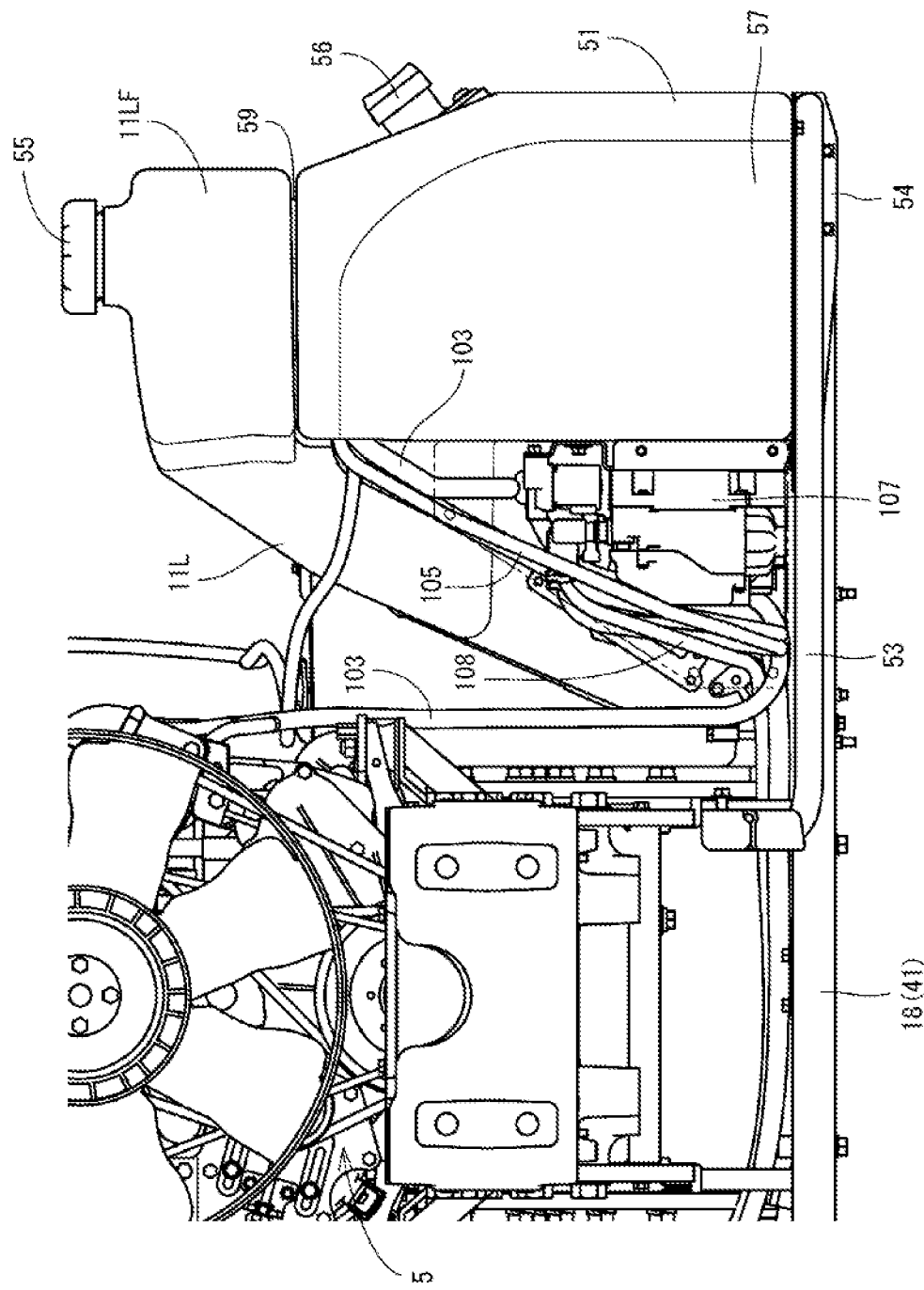
FIG. 9 illustrates a front view showing an arrangement of a left tank and a urea water tank.
Figure 10:
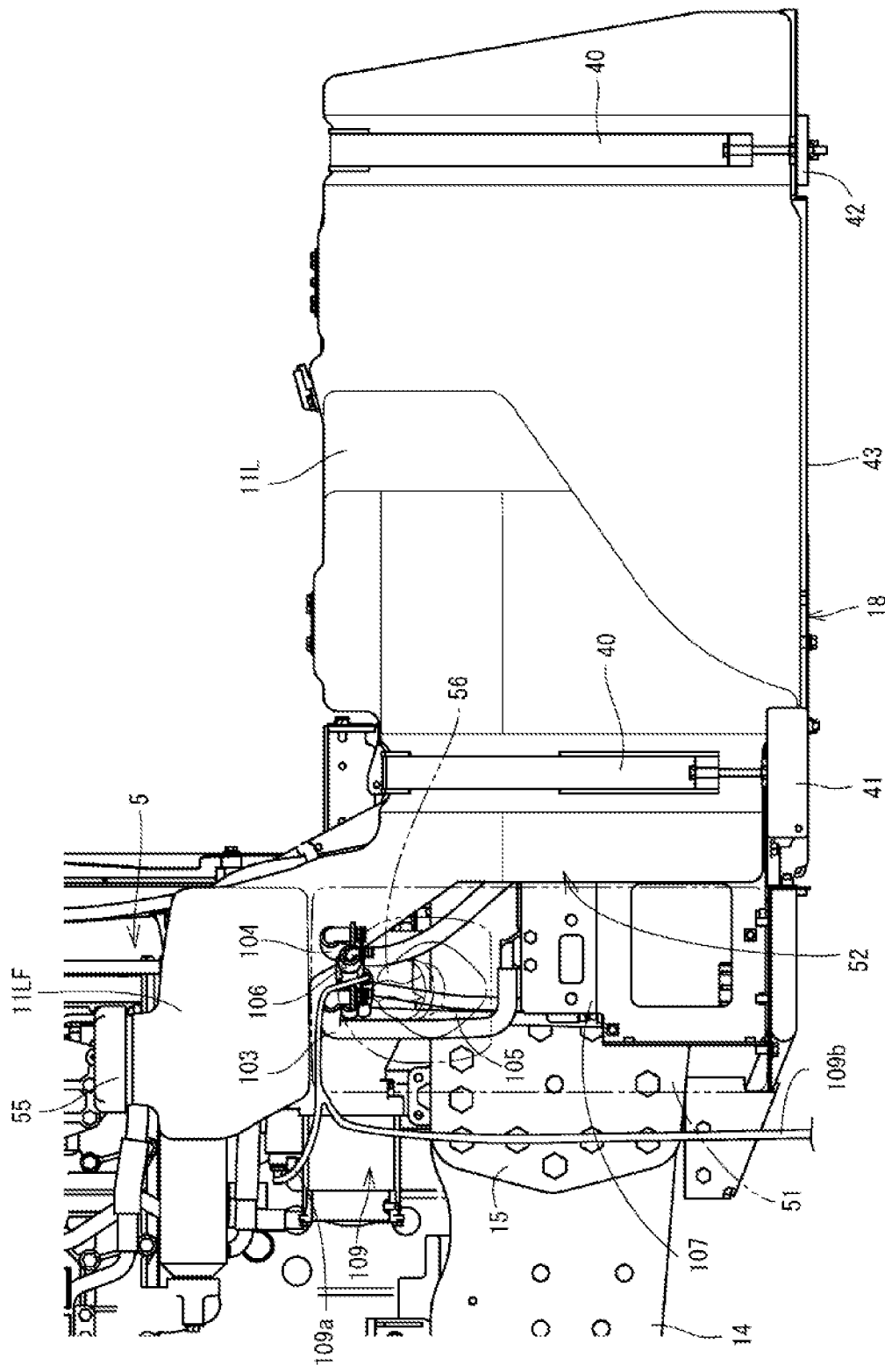
FIG. 10 illustrates a left side view showing an arrangement of the left tank.
Figure 11:
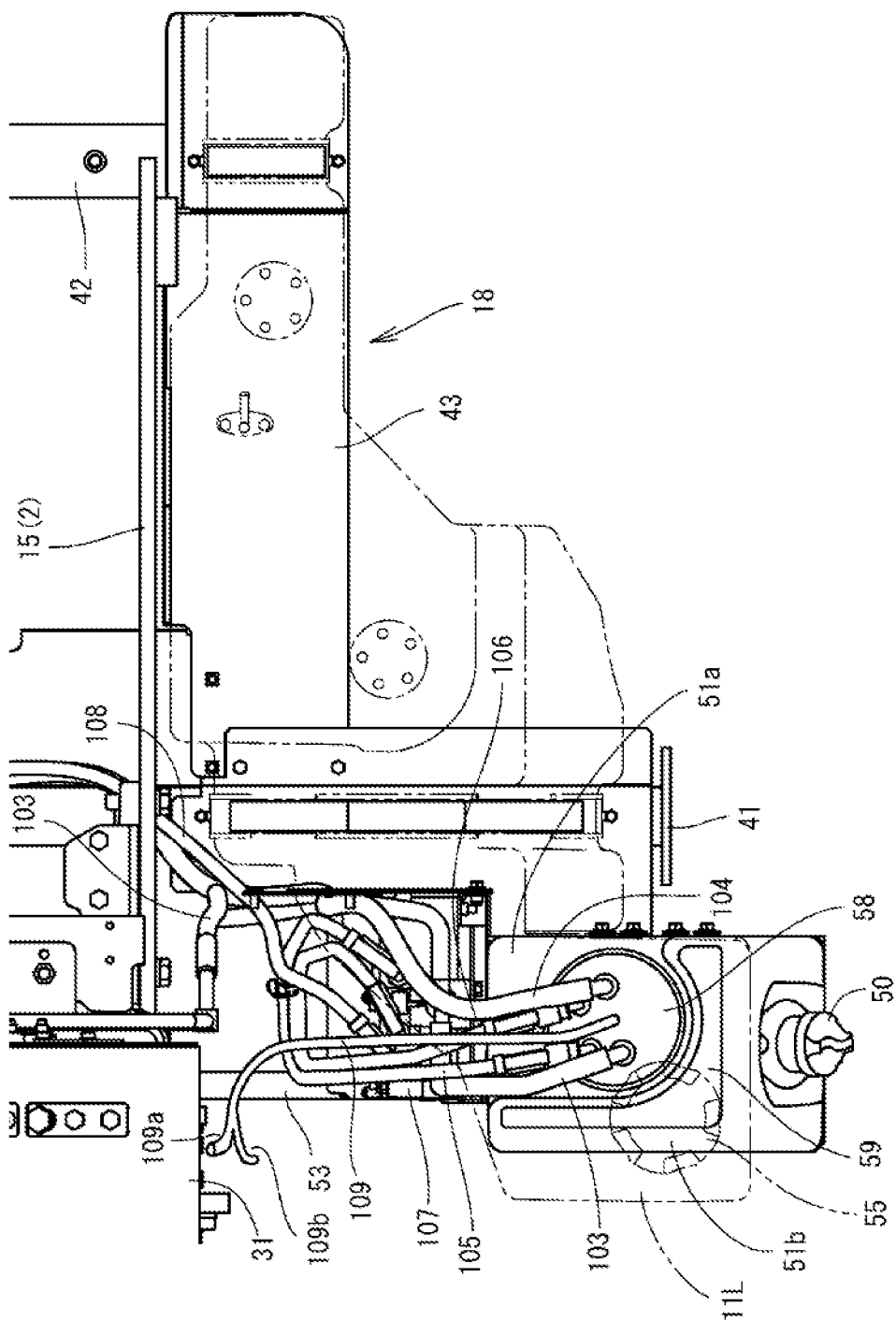
FIG. 11 illustrates a plan view showing an arrangement of the urea water tank.

As shown in FIG. 9 to FIG. 11, in a lower-front portion of the left tank 11L, a tank-accommodation recess 52 for accommodating the urea water tank 51 (reductant tank) is formed. The urea water tank 51 is a box-like member for containing urea water (urea water solution for selective catalytic reduction). An upper front portion 11LF of the left tank 11L and the urea water tank 51 are aligned up and down, while the urea water tank 51 is accommodated in the tank-accommodation recess 52. This can achieve both: a space for arranging the urea water tank 51, and the capacity of the left tank 11L or even the capacities of both of the entire fuel tank 11, without lengthening the longitudinal length of the tractor 1 or sacrificing the size of the cabin 7 (operation unit) and the step 10.

An auxiliary frame 53 extended toward the left tank 11L having the tank-accommodation recess 52 is provided to the traveling body 2. In this case, one end side of the auxiliary frame 53 is fastened to the left engine frame 14. The other end side of the auxiliary frame 53 fixes a tank seat 54 having a flat plate shape. The tank seat 54 is fastened to the left end side of the front lateral bridge frame 41 constituting the tank frame 18.

Figure 12:
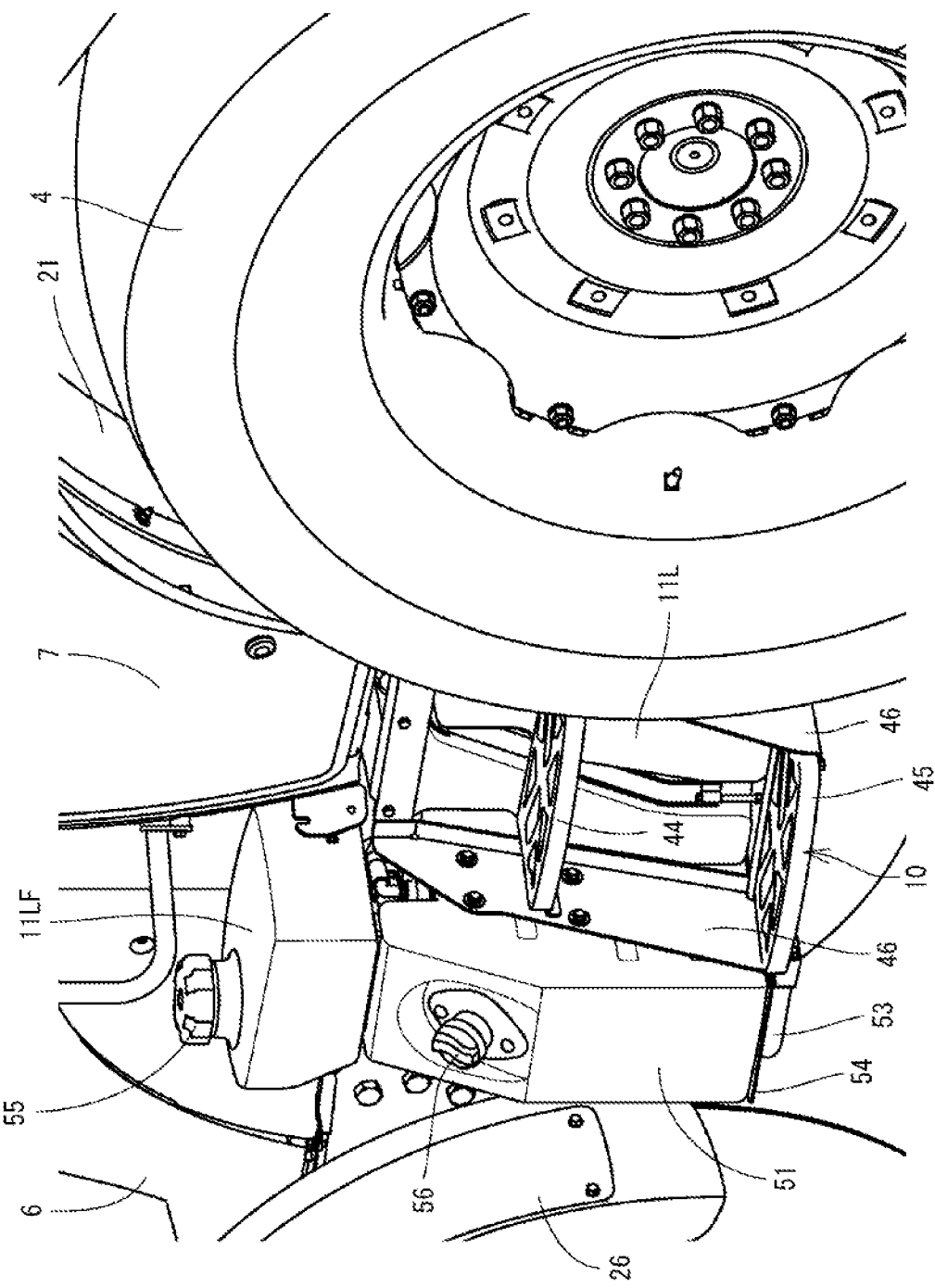
FIG. 12 illustrates a perspective view showing how the urea water tank is attached, as seen from obliquely left rear.

To the bottom surface and the rear surface of the urea water tank 51, an insert nut (not shown) is embedded. The bottom surface of the urea water tank 51 and the tank seat 54 are fastened with a bolt and the insert nut and the rear surface of the urea water tank 51 and a front side plate member 46 of the left step 10 are fastened with a bolt and the insert nut, while the urea water tank 51 is accommodated in the tank-accommodation recess 52 (see FIG. 4 and FIG. 12). With the left step 10 and the auxiliary frame 53, the urea water tank 51 is stably fixed and supported.

On the upper surface of the upper front portion 11LF of the left tank 11L, a fueling cylinder 55 protrudes upward. On the left outer side surface of the urea water tank 51, a supply cylinder 56 protrudes obliquely upward and outward. As described, since the direction in which the fueling cylinder 55 protrudes and the direction in which a supply cylinder 56 are different from each other, the fuel and the urea water can be supplied from the same side (left side) of the traveling body 2, and yet mistakes in supplying wrong one of the fuel and the urea water becomes less likely to occur. Particularly, in this embodiment, the fueling cylinder 55 for the fuel which is more frequently supplied is positioned above the supply cylinder 56 for the urea water. Therefore, the risk of mistakenly supplying fuel to the supply cylinder 56 of the urea water tank 51 is reduced.

Figure 13:
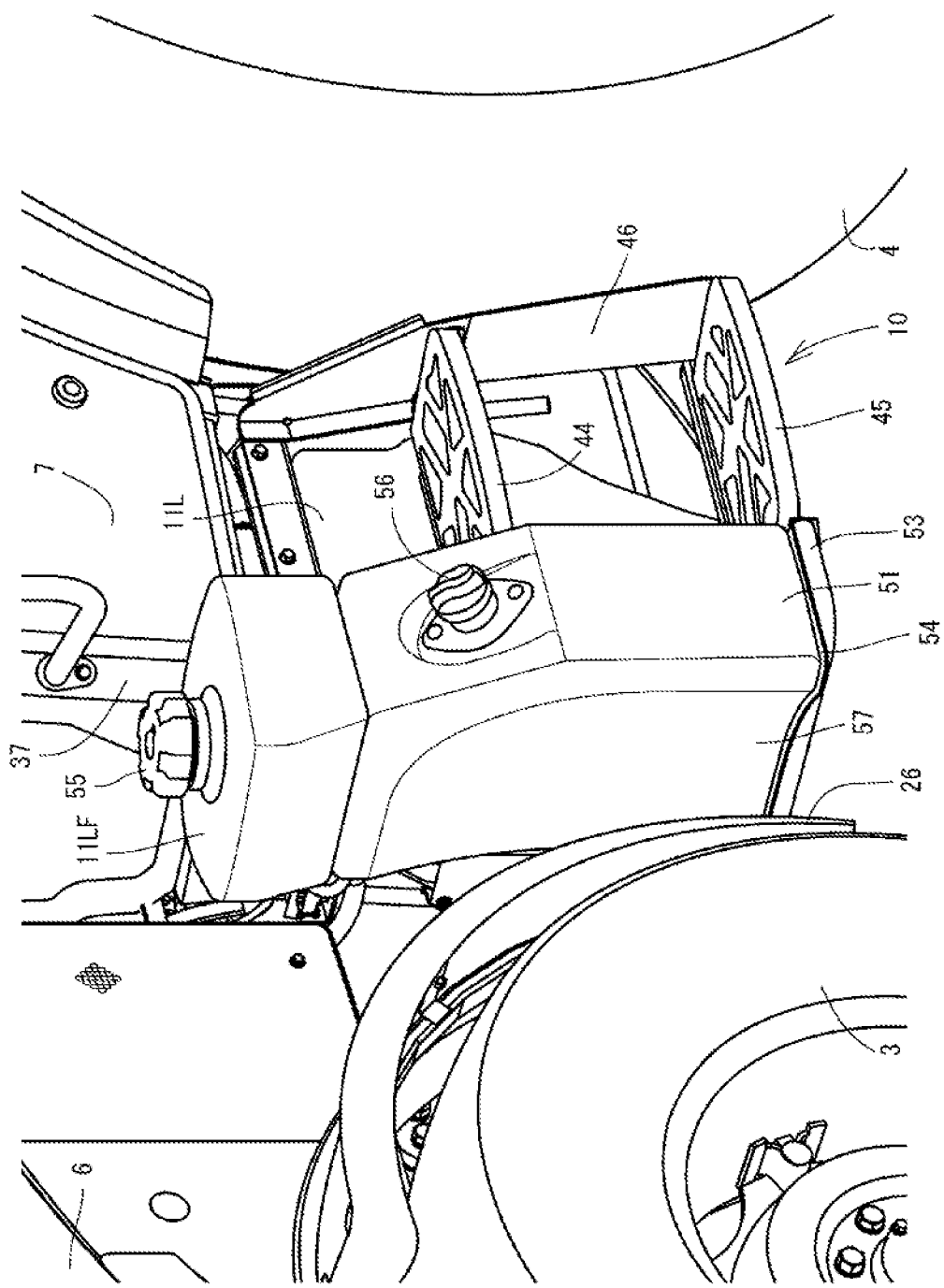
FIG. 13 illustrates a perspective view showing the shape of the front surface of the urea water tank, as seen from obliquely left front.
Figure 14:
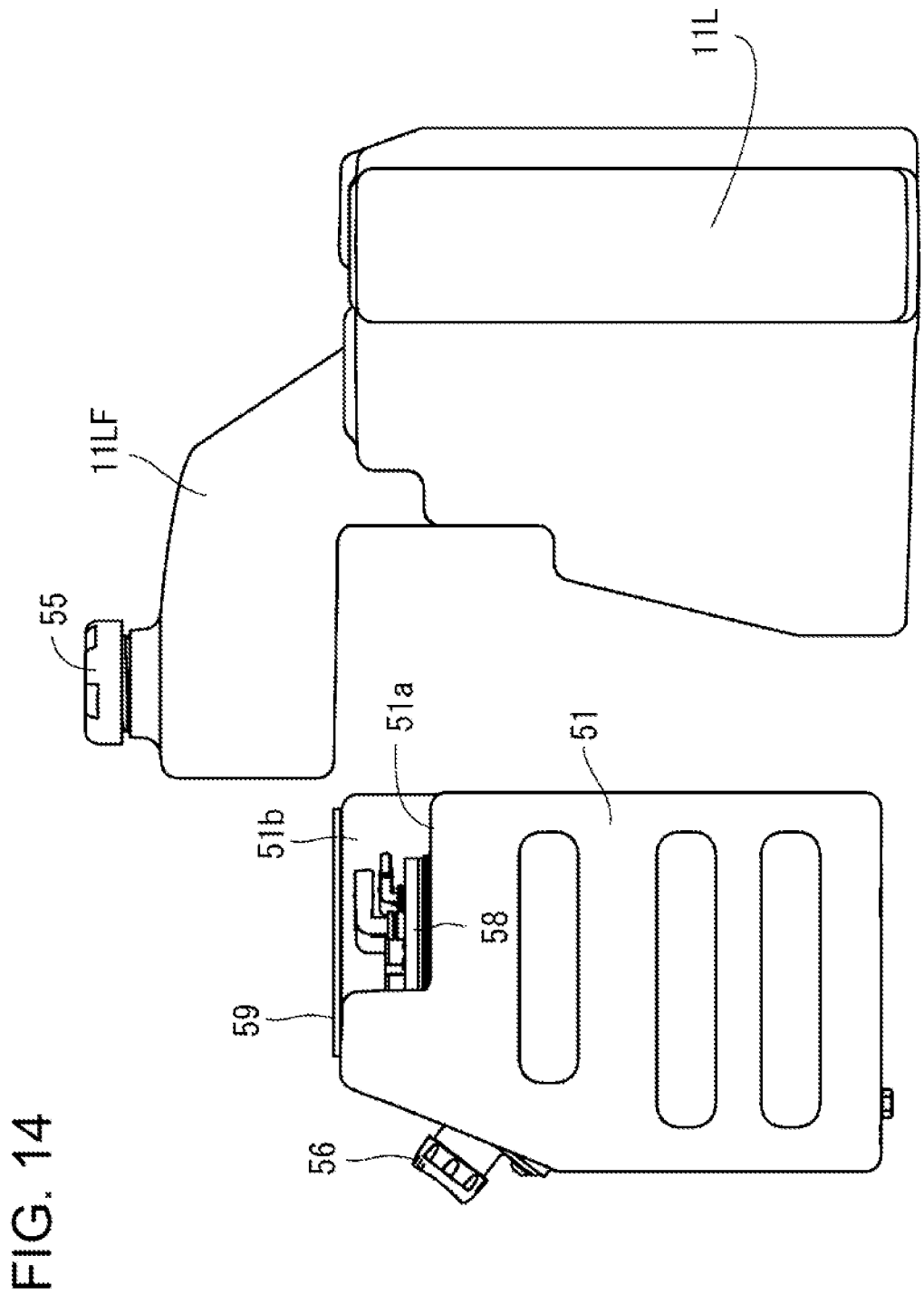
FIG. 14 illustrates a left side view of the left tank and the urea water tank.
Figure 15:
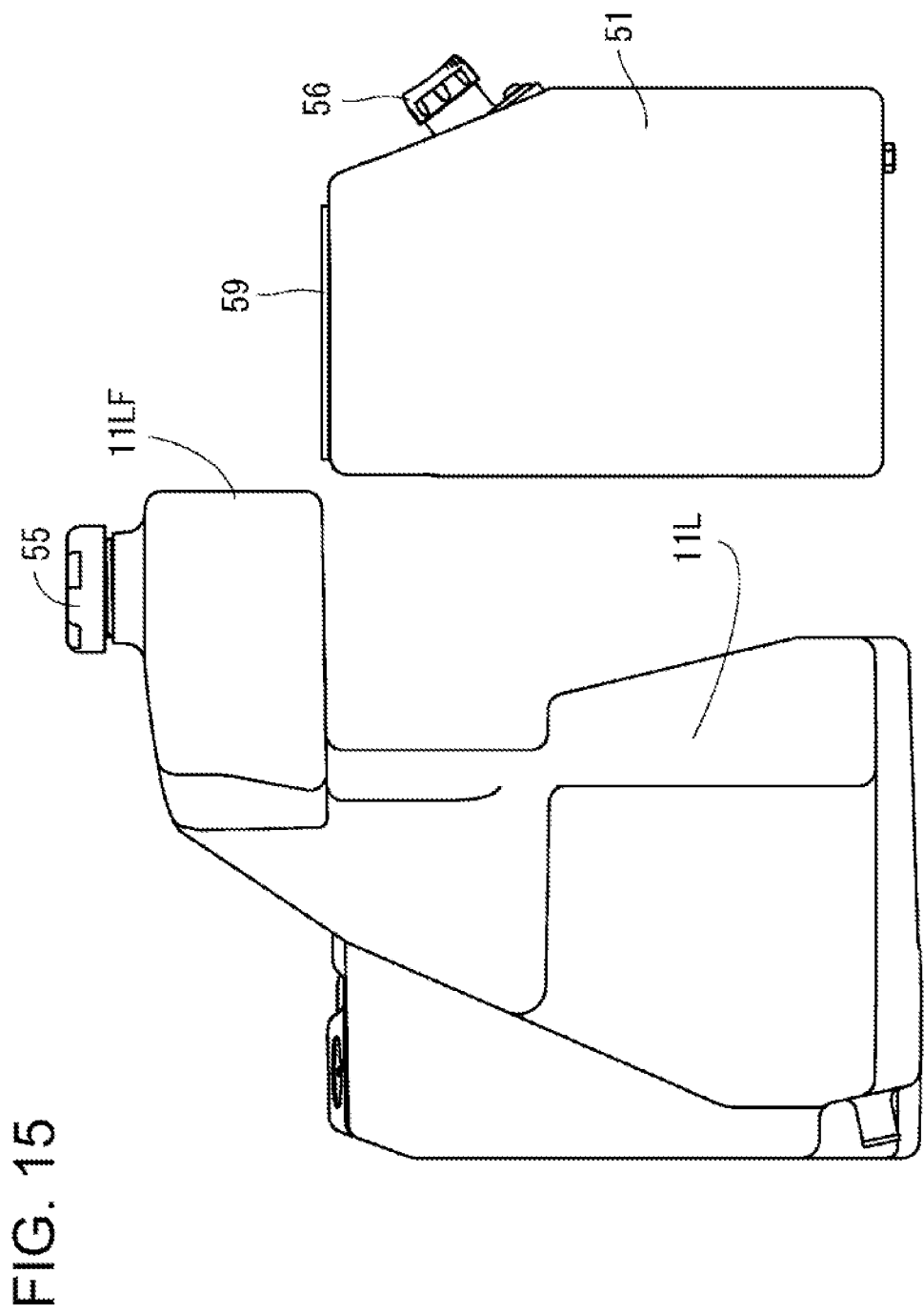
FIG. 15 illustrates a right side view of the left tank and the urea water tank.
Figure 16:
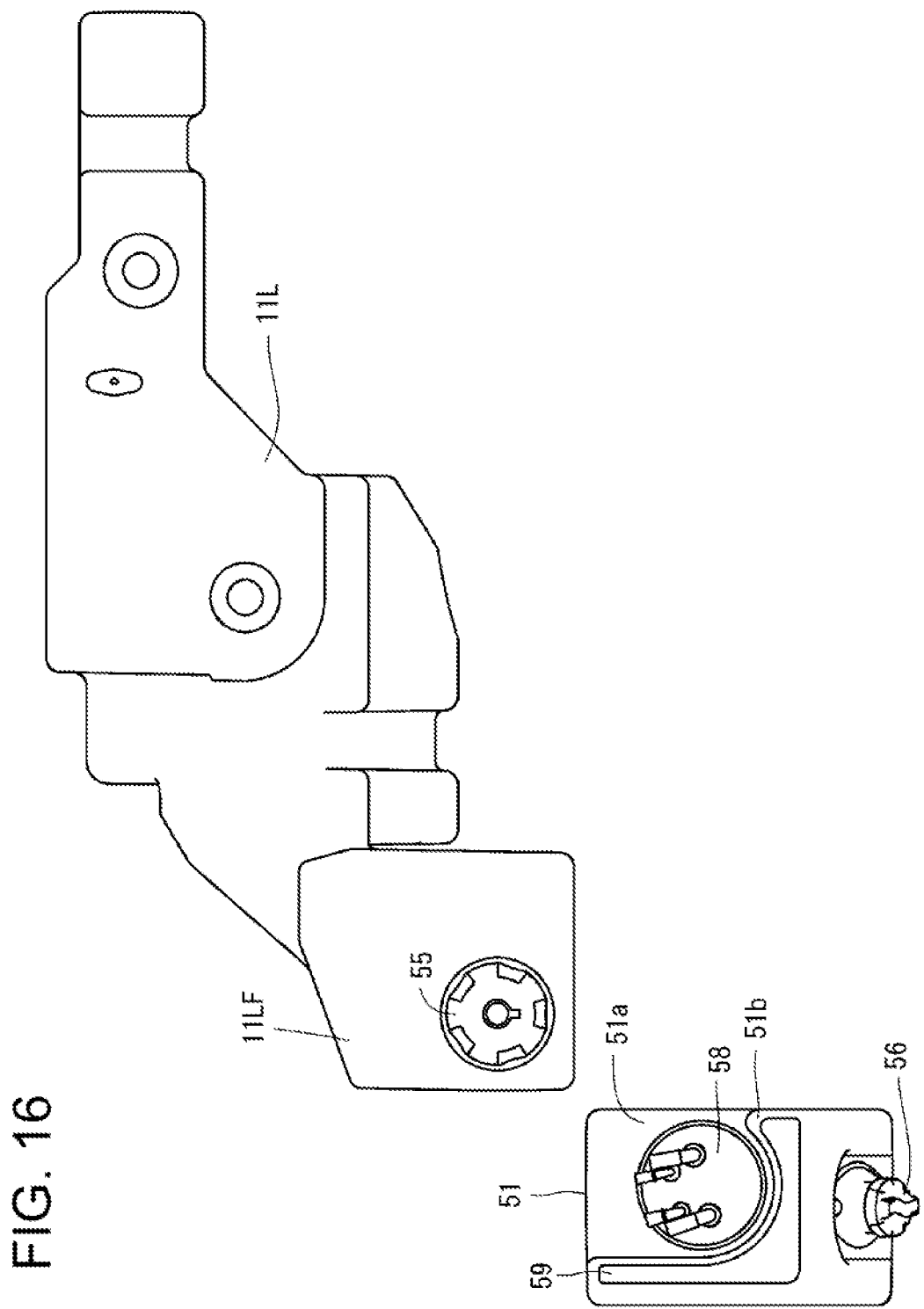
FIG. 16 illustrates a plan view of the left tank and the urea water tank.
Figure 17:
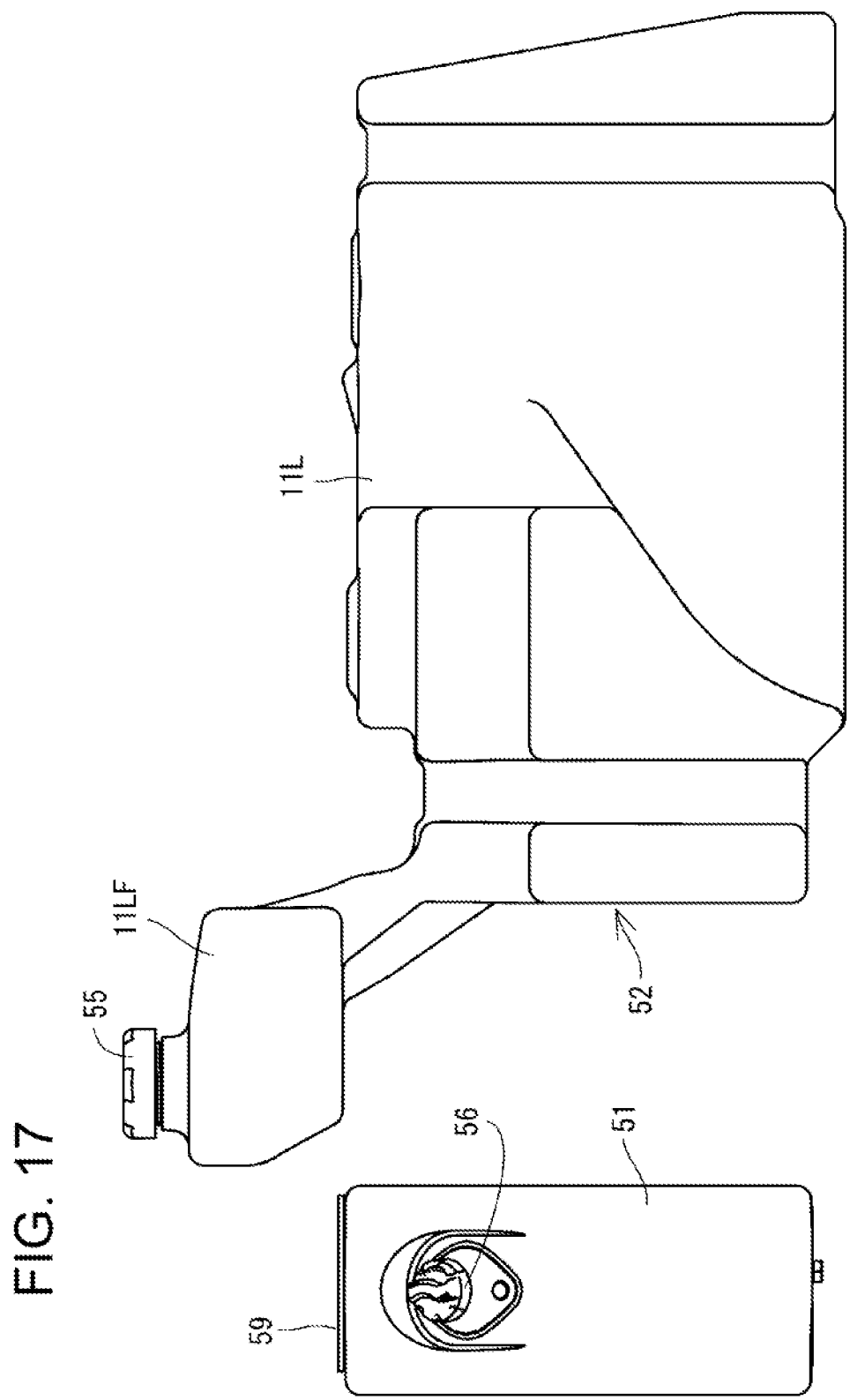
FIG. 17 illustrates a front view of the left tank and the urea water tank.
Figure 18:
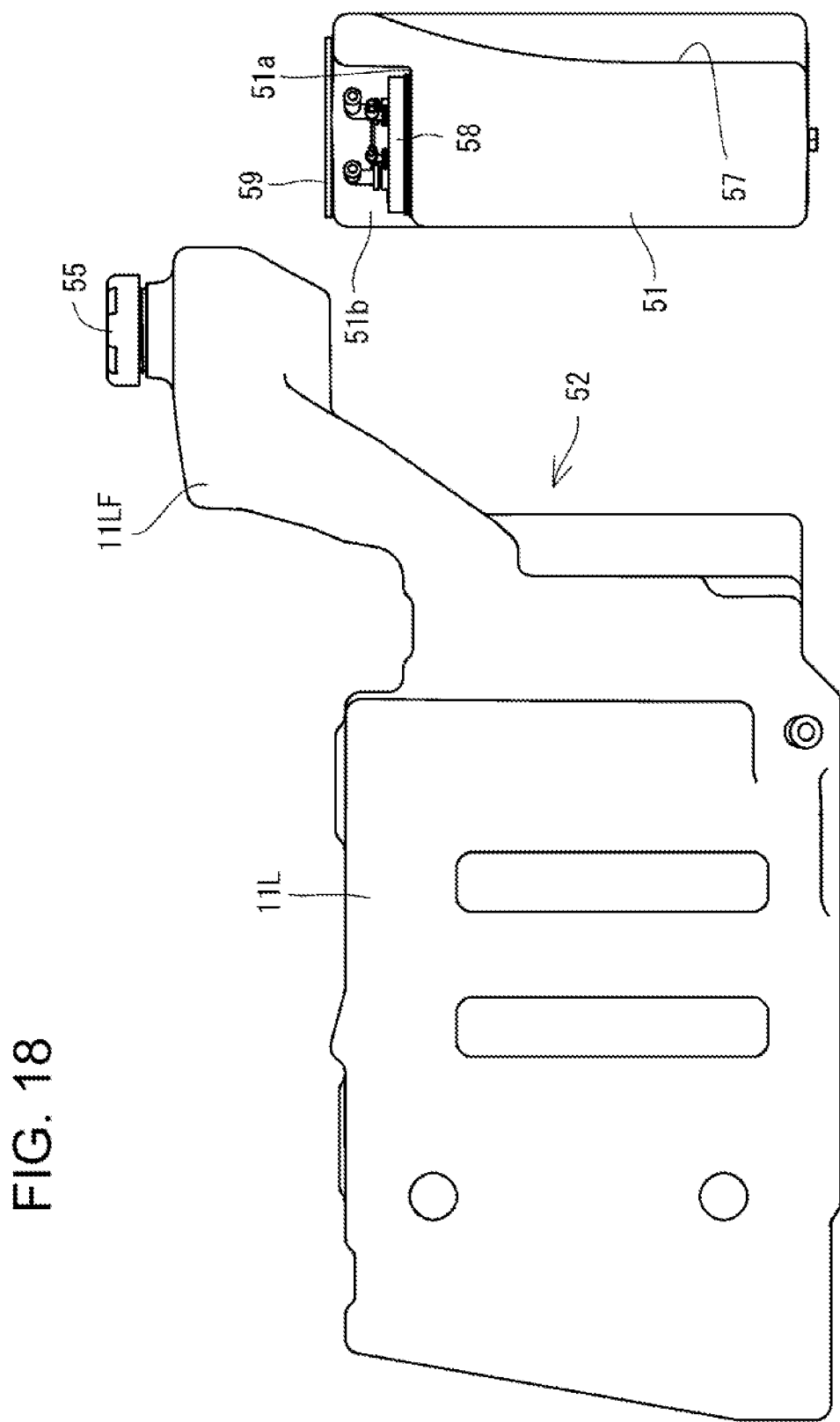
FIG. 18 illustrates a rear view of the left tank and the urea water tank.
Figure 19:
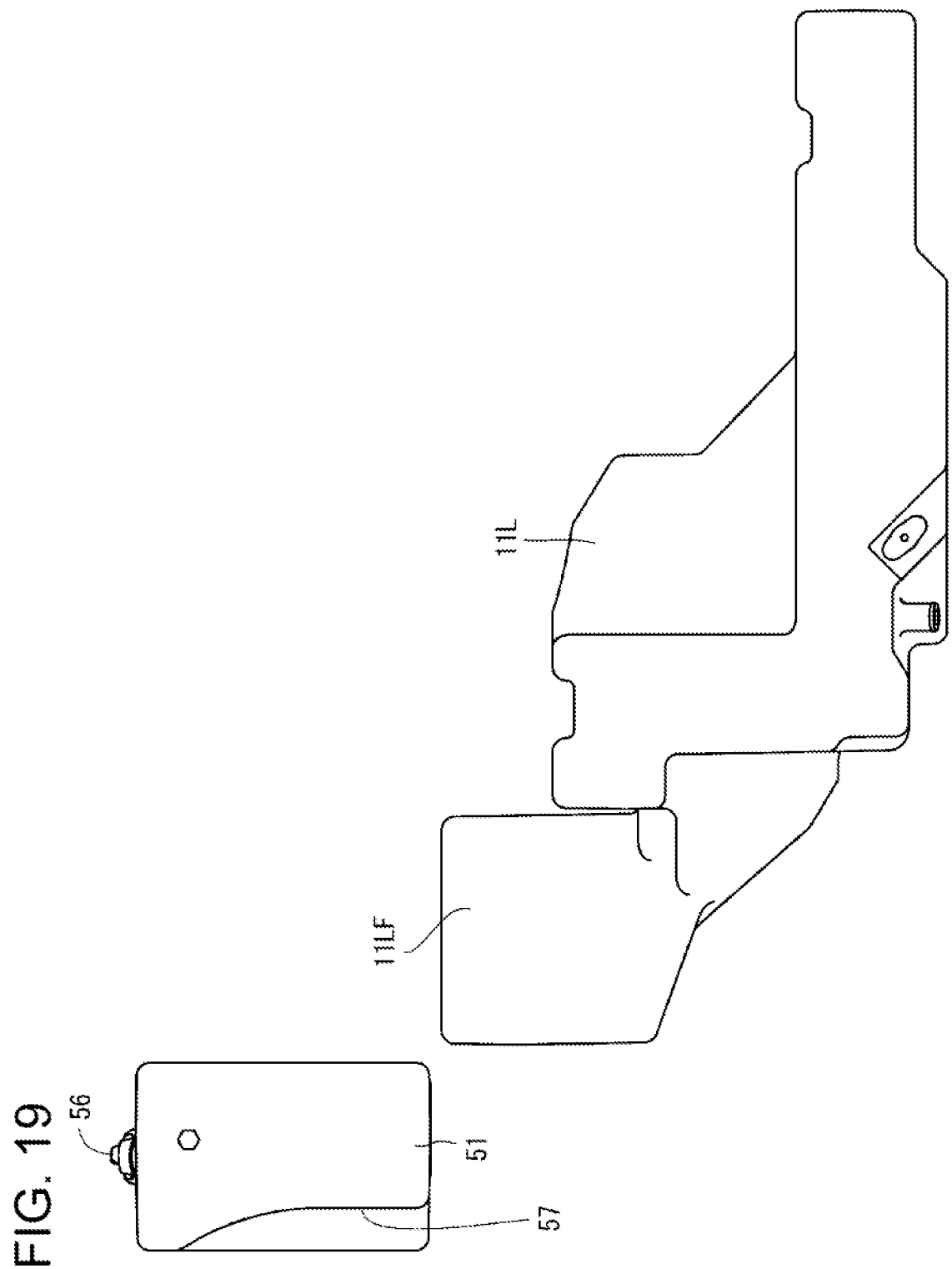
FIG. 19 illustrates a bottom view of the left tank and the urea water tank.
Figure 20:
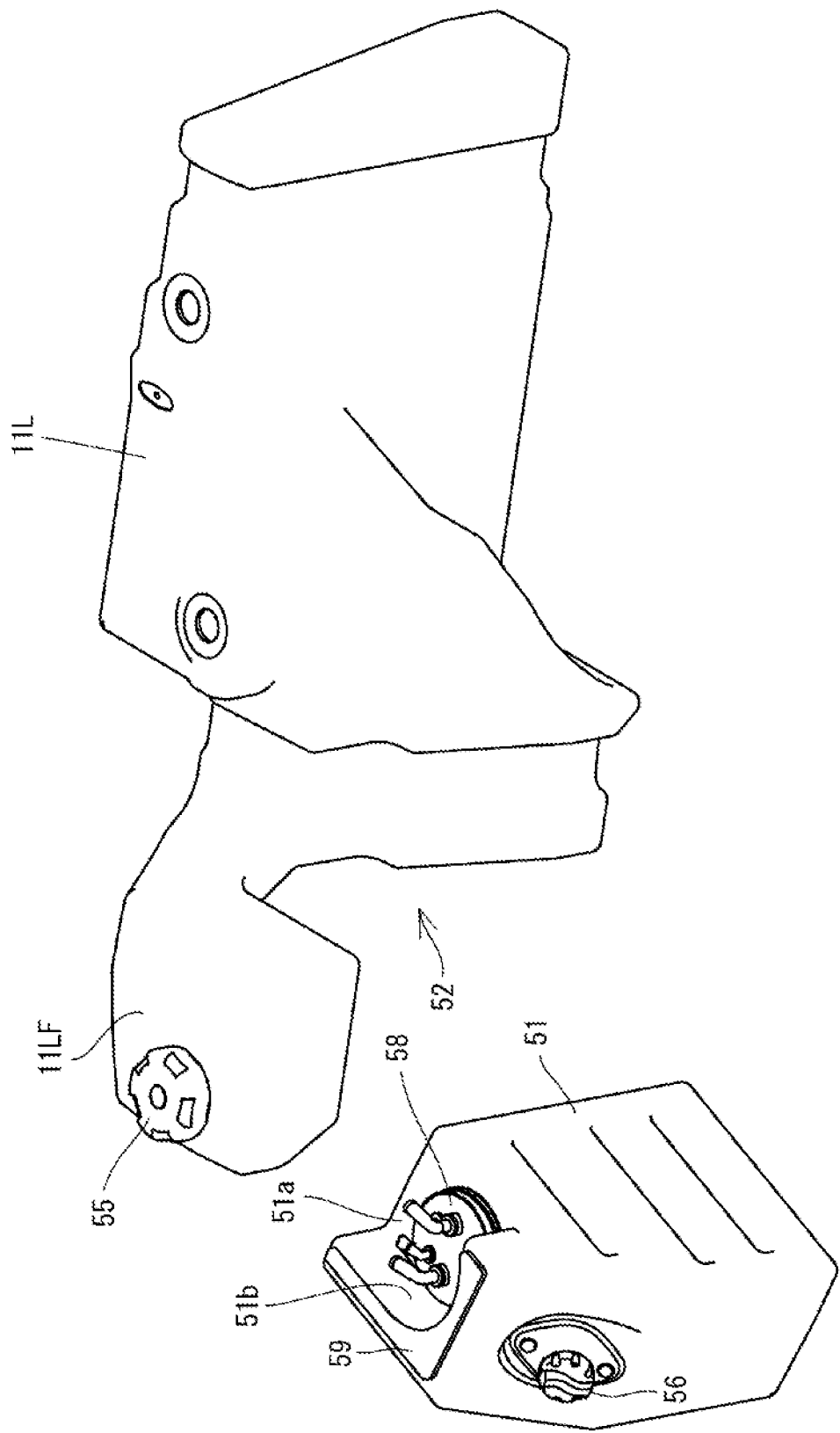
FIG. 20 illustrates a perspective view of the left tank and the urea water tank, as seen from obliquely left front.
Figure 21:
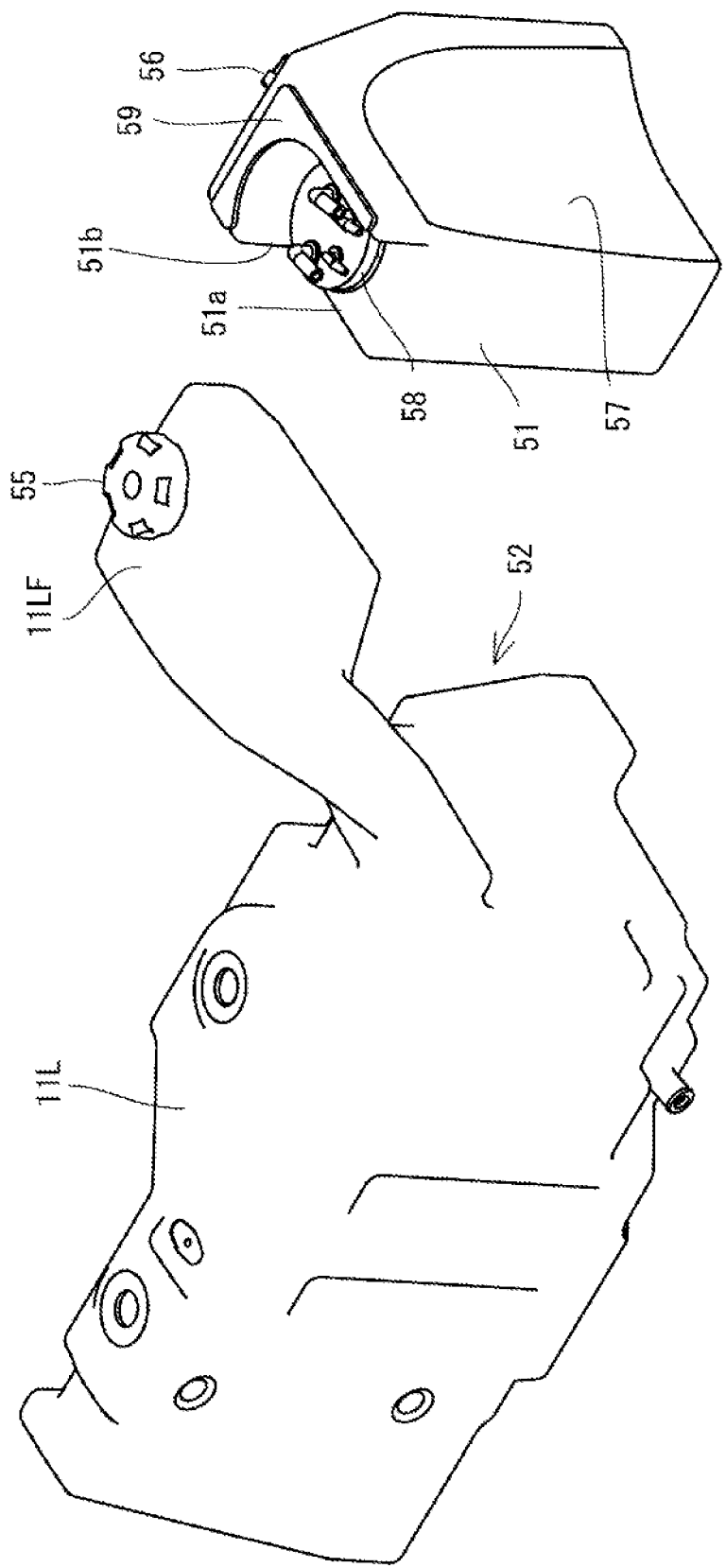
FIG. 21 illustrates a perspective view of the left tank and the urea water tank, as seen from obliquely right rear.

As shown in FIG. 13, the front surface of the urea water tank 51 has a recess 57 to avoid interference with the left front wheel 3 (including a left front fender 26). The recess 57 of this embodiment is a recess facing forward which is concaved along the outer circumference shape of the left front wheel 3 (including the left front fender 26). With the recess 57 on the front surface of the urea water tank 51, the left front wheel 3 hardly interfere with the urea water tank 51 when the front wheels 3, 3 are steered left and right. Thus, the urea water tank 51 can be arranged as close as possible to the left front wheel 3, and the longitudinal length of the tractor 1 and the like can be made compact.

Figure 7:
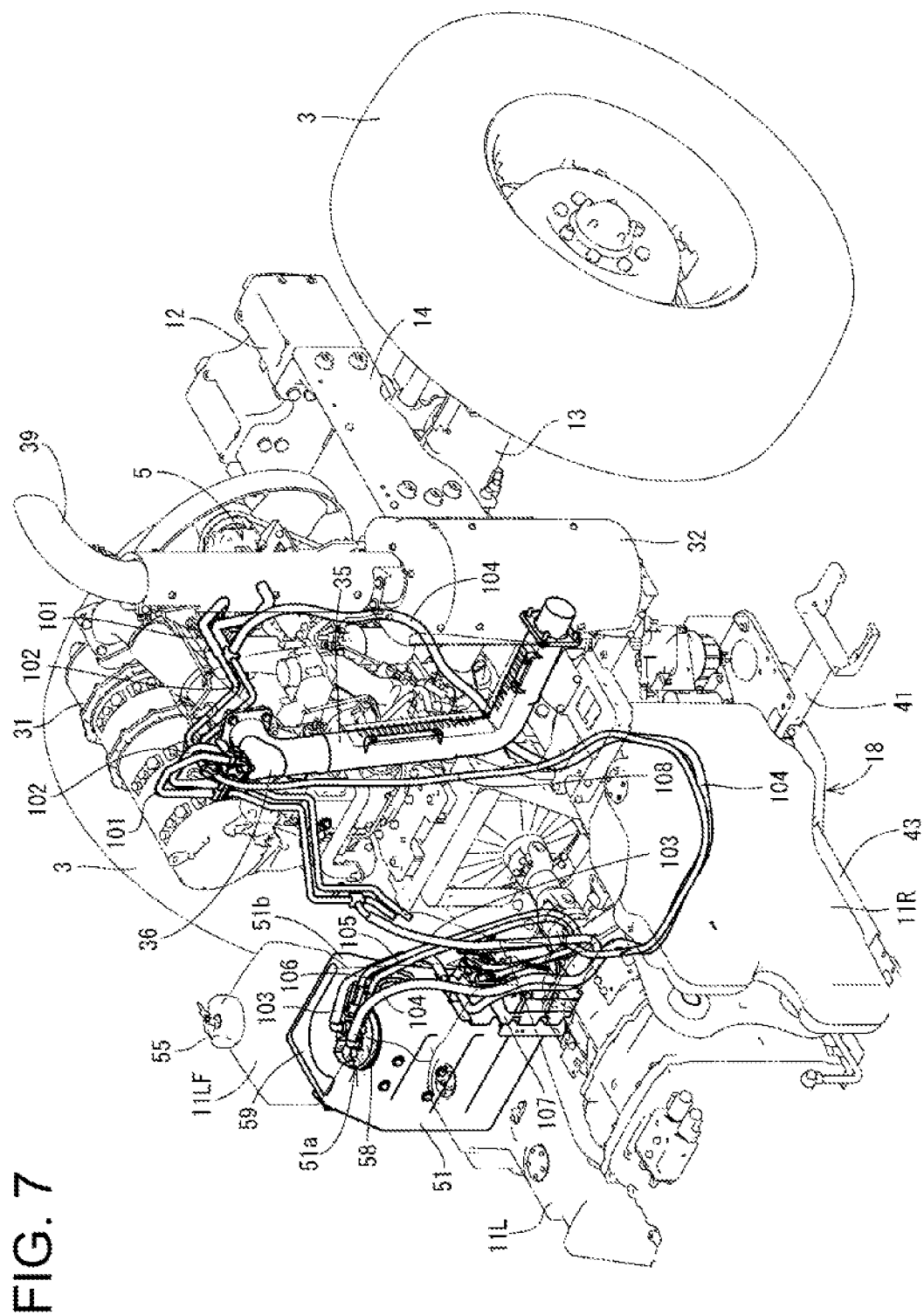
FIG. 7 illustrates a perspective view showing a urea water piping system.

As shown in FIG. 7 and FIG. 8, the engine 5 (cooling water pump) and the urea water injection unit 36 are in communication with each other through a cooling water feed pipe 101 and a cooling water return pipe 102. One ends of the cooling water feed pipe 101 and the cooling water return pipe 102 are connected to the engine 5 (cooling water pump). The other ends of the cooling water feed pipe 101 and the cooling water return pipe 102 are connected to the urea water injection unit 36. The cooling water feed pipe 101 and the cooling water return pipe 102 are connected in the urea water injection unit 36. The cooling water heated by the engine 5 is fed from the cooling water feed pipe 101 to the cooling water return pipe 102 through the urea water injection unit 36, thus keeping the urea water from being frozen in the urea water injection unit 36. The cooling water having passed through the urea water injection unit 36 is returned to the engine 5 (cooling water pump) through the cooling water return pipe 102.

A cooling water supply pipe 103 is branched from a middle portion of the cooling water feed pipe 101. The cooling water supply pipe 103 is connected to a tank sensor unit 58 attached to the urea water tank 51. In this case, an indentation 51a which is a recess opened upward is formed on the upper surface side of the urea water tank 51. An upward protrusion 51b on the upper surface side of the urea water tank 51 is in contact with the bottom surface of the upper front portion 11LF in the left tank 11L through an L-shaped buffer member 59. The tank sensor unit 58 is detachably attached to an upper surface opening of the indentation 51a of the urea water tank 51. The tank sensor unit 58 also functions as a lid of the upper surface opening. The tank sensor unit 58 is connected to the cooling water supply pipe 103, a cooling water collection pipe 104, a urea water feed pipe 105, a urea water return pipe 106, and the like.

The cooling water supply pipe 103 and the cooling water collection pipe 104 are connected in the urea water tank 51. The cooling water collection pipe 104 is connected to the engine 5 (cooling water pump). The cooling water heated by the engine 5 is fed from the cooling water supply pipe 103 to the cooling water collection pipe 104 through the urea water tank 51, thus keeping the urea water from being frozen in the urea water tank 51. The cooling water having passed through the urea water tank 51 is returned to the engine 5 (cooling water pump) through the cooling water collection pipe 104.

The other ends of the urea water feed pipe 105 and the urea water return pipe 106 whose one ends are connected to the tank sensor unit 58 are connected to a urea water supply device 107 (supply module, reductant supply device) configured to supply urea water in the urea water tank 51 to the urea water injection unit 36 of the urea mixing pipe 35. The urea water supply device 107 is connected to the urea water injection unit 36 through a urea water injection pipe 108. The urea water supply device 107 sucks the urea water in the urea water tank 51 through the urea water feed pipe 105, and supplies the urea water to the urea water injection unit 36 through the urea water injection pipe 108, to spray the urea water in the urea mixing pipe 35. The surplus urea water is returned to the urea water tank 51 through the urea water return pipe 106.

As shown in FIG. 9 to FIG. 11, the urea water supply device 107 is arranged between the traveling body 2 and the urea water tank 51. Although details are omitted, the urea water supply device 107 includes a urea water pump configured to pressure-feed the urea water in the urea water tank 51, and a drive motor configured to drive the urea water pump. By the urea water supply device 107 supplying the urea water in the urea water tank 51 to the urea water injection unit 36 of the urea mixing pipe 35, the urea water is sprayed from the urea water injection unit 36 into the urea mixing pipe 35. In this case, the urea water supply device 107 is arranged on the tank seat 54 between the left vehicle body frame 15 and the urea water tank 51. Thus, a dead space between the traveling body 2 (left vehicle body frame 15) and the urea water tank 51 is effectively used as a space for arranging the urea water supply device 107. Therefore, the distance of the urea water piping system from the urea water tank 51 to the urea water injection unit 36 of the urea mixing pipe 35 through the urea water supply device 107 can be shortened.

As shown in FIG. 10 and FIG. 11, the tank sensor unit 58 of the urea water tank 51 is connected to one end of a breather pipe 109 for relieving the pressure of the urea water tank 51. The other end of the breather pipe 109 is branched into two branches. One of the branched pipe portions 109a is extended upward and opened. The other one of the branched pipe portions 109b is extended downward and opened at a midway of the traveling body 2 relative to the left-right direction (further inward than the front and rear wheels 3 and 4, relative to the left-right direction). Therefore, the pressure in the urea water tank 51 is kept constant by introducing outside air through the upward pipe portion 109a of the breather pipe 109, at a time of supplying the urea water. For example, even if the vibration of the engine 5 or shaking of the urea water tank 51 caused by unevenness of the field causes the urea water to enter the breather pipe 109, the urea water drops from the downward pipe portion 109b of the breather pipe 109. Therefore, clogging of the upward pipe portion 109a caused by, for example, adhesion and deposition of the urea can be avoided. Therefore, smooth introduction of the outside air can be reliably performed through the breather pipe 109.

It goes without saying that the positional relationship among the tank-accommodation recess 52, the urea water tank 51, and the second case 32 is not limited to the example mentioned in this embodiment, and the left and right sides may be reversed. In such a case, the positional relationship among the battery 50, the left and right fuel tanks 11, the steps 10, and the like are also reversed.

The configurations of respective parts of the present invention are not limited to those of the illustrated embodiment, but can be variously changed without departing from the gist of the invention.

REFERENCE SIGNS LIST 1 tractor
2 traveling body
5 diesel engine
7 cabin
10 step
11 fuel tank
11L left tank
11LF upper front portion of left tank
11R right tank
18 tank frame
31 first case
32 second case
35 urea mixing pipe
36 urea water injection unit
39 tail pipe
51 urea water tank
52 tank-accommodation recess
55 fueling cylinder
56 supply cylinder
57 recess
58 tank sensor unit
107 urea water supply device

The invention claimed is:
1. A tractor comprising:
a traveling body having an engine;
a pair of left and right front wheels and a pair of left and right rear wheels configured to support the traveling body;
steps for getting on and off of an operation unit on the traveling body;
a fuel tank configured to supply fuel to the engine;
a post-processing device configured to purify exhaust gas of the engine; and
a reductant tank configured to store a reductant to be supplied to the post-processing device,
wherein the reductant tank is arranged between one of the steps and one of the front wheels, on one of left and right sides of the traveling body; and
wherein at least a portion of a refueling cylinder of the fuel tank is provided directly above the reductant tank.
2. The tractor according to claim 1, wherein:
a rear surface of the reductant tank is supported on a step side via a supporting member; and
a front surface of the reductant tank has a recess.
3. The tractor according to claim 2, wherein:
a front fender is provided on a rear of the one of the front wheels; and
the recess is formed on the front surface of the reductant tank and on a side where the front fender is provided, the recess being concaved along an outer circumference shape of the front fender.
4. The tractor according to claim 1, wherein a rear surface of the reductant tank is supported on a step side via a supporting member.

5. The tractor according to claim 1, wherein a front surface of the reductant tank has a recess.

6. The tractor according to claim 5, wherein the recess is concaved along an outer circumference shape of a front fender.

7. The tractor according to claim 1, wherein a front fender is provided on a rear of the one of the front wheels.

8. The tractor according to claim 1, wherein a recess is formed on a front surface of the reductant tank and on a side where a front fender is provided.

9. The tractor according to claim 8, wherein the recess is concaved along an outer circumference shape of the front fender.

10. The tractor according to claim 8, further comprising the operation unit.

11. The tractor according to claim 1, further comprising a sensor coupled to the reductant tank and interposed between the fuel tank and the reductant tank.

12. The tractor according to claim 1, wherein a portion of a top surface of the reductant tank is interposed between a bottom surface of the reductant tank and a bottom surface of the fuel tank.

13. A tractor comprising:
a traveling body;
a pair of left and right front wheels coupled to the traveling body;
steps configured for access to and from an operation unit coupled to the traveling body;
a fuel tank configured to supply fuel to an engine; and
a reductant tank configured to store a reductant to be supplied to a post-processing device,
wherein the reductant tank is arranged between one of the steps and one of the front wheels, on one of a left side of the traveling body or a right side of the traveling body, and
wherein a refueling cylinder of the fuel tank is provided directly above the reductant tank.

14. The tractor according to claim 13, further comprising the engine coupled to the traveling body.

15. The tractor according to claim 13, further comprising a pair of left and right rear wheels coupled to the traveling body.

16. The tractor according to claim 13, further comprising a post-processing device configured to purify exhaust gas of an engine coupled to the traveling body.

17. The tractor according to claim 13, wherein the reductant tank is arranged on the left side of the traveling body.

18. The tractor according to claim 13, further comprising the operation unit.

19. The tractor according to claim 13, wherein:
a rear surface of the reductant tank is supported on a step side via a supporting member; and
a front surface of the reductant tank has a recess.

20. The tractor according to claim 19, wherein:
a front fender is provided on a rear of the one of the front wheels; and
the recess is formed on the front surface of the reductant tank and on a side where the front fender is provided, the recess being concaved along an outer circumference shape of the front fender.

* * * * *